US007523279B2

(12) United States Patent
Nanki et al.

(10) Patent No.: US 7,523,279 B2
(45) Date of Patent: Apr. 21, 2009

(54) INFORMATION PROCESSING APPARATUS FOR ACCESSING MEMORY SPACES INCLUDING A USER MEMORY SPACE AND A SECURE MEMORY SPACE

(75) Inventors: Hidenori Nanki, Osaka (JP); Shiro Yoshioka, Hyogo (JP); Kenichi Kawaguchi, Hyogo (JP); Toshiya Kai, Osaka (JP); Shinichiro Fukai, Osaka (JP)

(73) Assignee: Panasonic Corporation, Osaka (JP)

( * ) Notice: Subject to any disclaimer, the term of this patent is extended or adjusted under 35 U.S.C. 154(b) by 828 days.

(21) Appl. No.: 10/764,513

(22) Filed: Jan. 27, 2004

(65) Prior Publication Data

US 2004/0187019 A1 Sep. 23, 2004

(30) Foreign Application Priority Data

Feb. 4, 2003 (JP) ............................ P2003-026810

(51) Int. Cl.
*G06F 12/14* (2006.01)
(52) U.S. Cl. ...................... 711/163; 711/152; 711/154; 711/E12.093; 726/27
(58) Field of Classification Search .................. 711/163
See application file for complete search history.

(56) References Cited

U.S. PATENT DOCUMENTS

| 4,523,271 | A | * | 6/1985 | Levien ........................ 726/22 |
| 4,590,552 | A | * | 5/1986 | Guttag et al. ................ 711/163 |
| 5,237,616 | A | * | 8/1993 | Abraham et al. ............. 713/193 |
| 5,386,552 | A | * | 1/1995 | Garney ......................... 714/10 |
| 5,414,864 | A | * | 5/1995 | Koizumi ...................... 712/228 |
| 5,680,581 | A | * | 10/1997 | Banno et al. ................... 710/38 |
| 5,737,760 | A | * | 4/1998 | Grimmer et al. ............. 711/163 |
| 6,101,586 | A | * | 8/2000 | Ishimoto et al. ............. 711/163 |
| 2001/0008015 | A1 | | 7/2001 | Vu et al. |
| 2003/0023871 | A1 | * | 1/2003 | Gnanasabapathy et al. .. 713/200 |

OTHER PUBLICATIONS

Intel Corp., "80C186EA/80C188EA Microprocessor User's Manual," 1995, Ch. 1-2, pp. 1-1 to 2-49.*

* cited by examiner

*Primary Examiner*—Pierre-Michel Bataille
*Assistant Examiner*—Michael C Krofcheck
(74) *Attorney, Agent, or Firm*—McDermott Will & Emery LLP

(57) ABSTRACT

An information processing apparatus comprising a secure information unit that is set to the state not requiring security in the case where the data is transferred from a user memory space to a general purpose register, and that is set to the state requiring security in the case where the data is transferred from a secure memory space to the general purpose register. An encryption key in the secure memory space is prevented from being stolen by prohibiting the data transfer to the user memory space from the general purpose register with the value of the secure information unit set to the state requiring security.

6 Claims, 21 Drawing Sheets

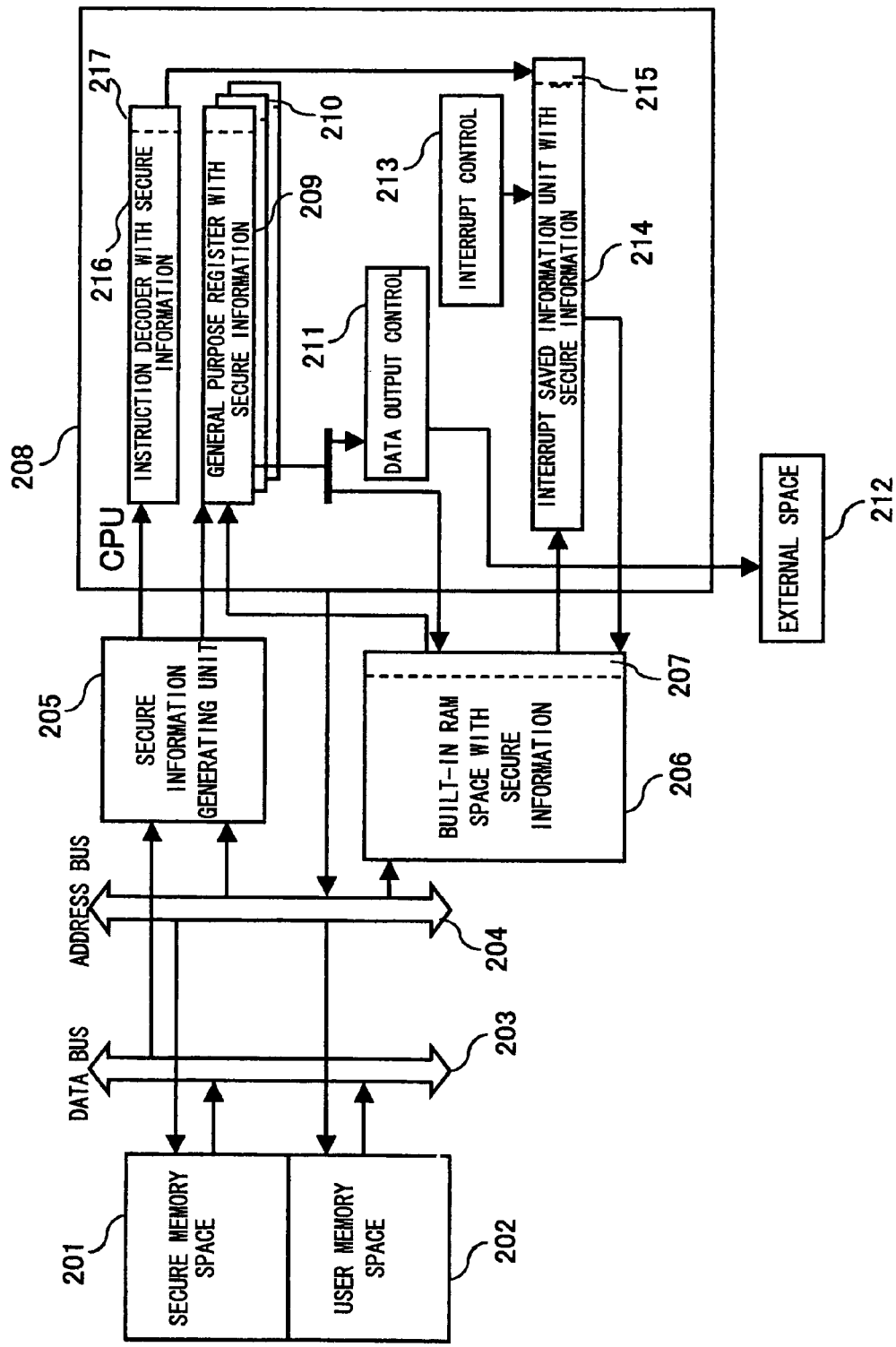

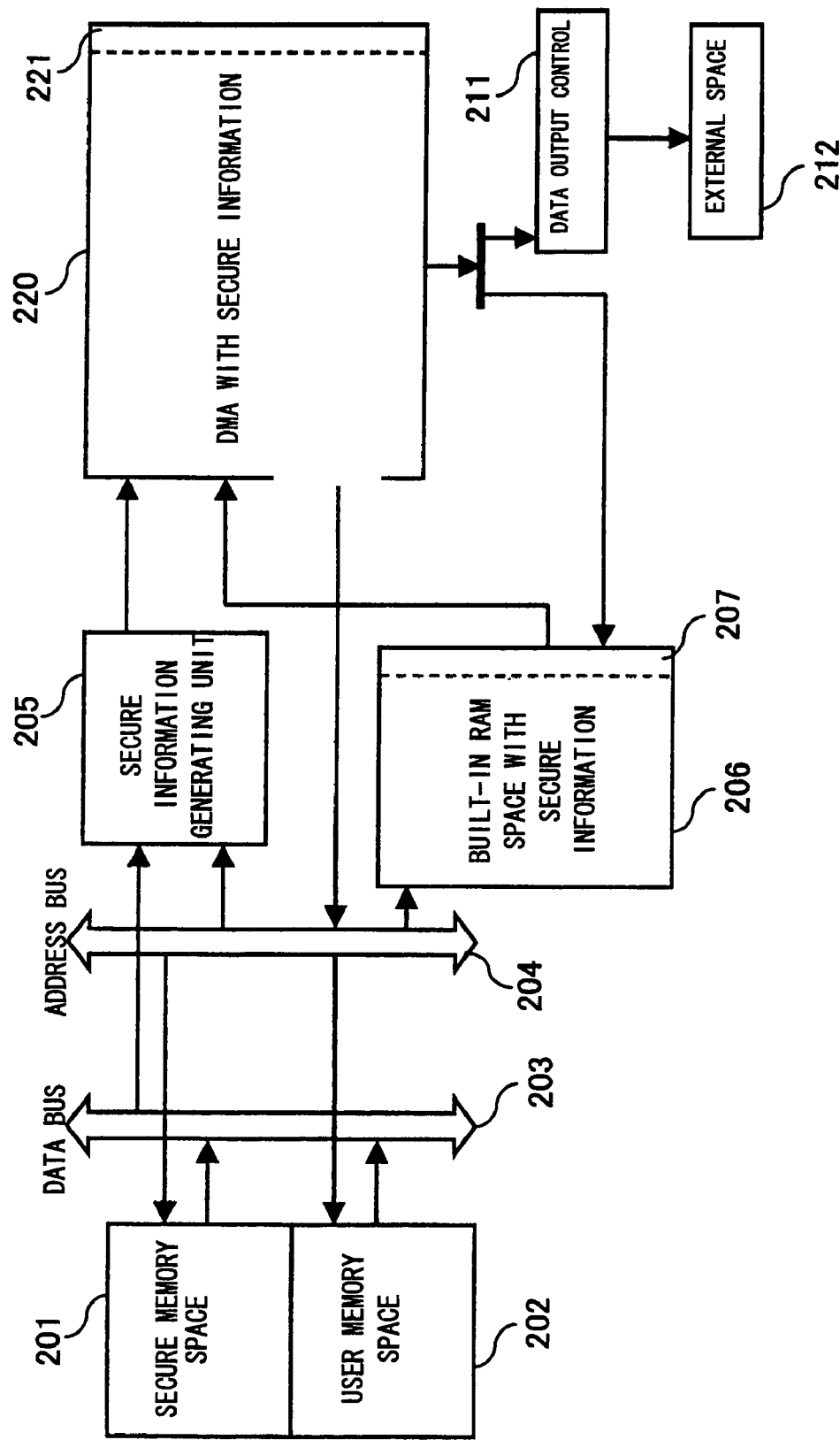

INFORMATION PROCESSING APPARATUS FOR ACCESSING MEMORY SPACES INCLUDING A USER MEMORY SPACE AND A SECURE MEMORY SPACE

BACKGROUND OF THE INVENTION

The present invention relates to an information processing apparatus for accessing memory spaces including a user memory space and a secure memory space.

In maintaining security of a SD card, for example, the password is decoded into decrypted data by hardware using the encryption data and the encryption key in the SD card. In the future, in order to meet the requirement of a plurality of encryption events, the decryption may be executed by software for the contents service such as PDA (personal digital assistant).

As a technique for preventing external leakage of the decryption software, there is a method in which the areas accessible by the user are differentiated in the privileged mode and the normal mode of OS (operating system). There is also a method to prevent external leakage of the decryption software by a hardware memory protection function such as a memory management unit.

In PDA using an open source OS such as Linux, the software development environment is widely disclosed to the users. As a result, the development of applications is facilitated. On the other hand, the encryption key, the data and the instructions stored in the secure memory space inaccessible in the user mode are may be easily stolen by being transferred to the user memory space or the external space using the privileged mode of OS.

In Japan, the digitization in the broadcasting field is under way since December 2000 when the BS digital broadcasting was started. The problem has since been encountered of the violation of the copyright of the digital contents broadcast. Some broadcast contents providers have come to seek strict copyright protection in providing the contents. In order to promote the digitization of the broadcasting media and the smooth distribution of the digital contents, some action must be taken to protect the right to the broadcast contents.

SUMMARY OF THE INVENTION

Accordingly, the primary object of this invention is to provide an information processing apparatus in which an encryption key, data or instructions in secure memory space cannot be read simply by use of the privileged mode granted to an open development environment in spite of the transparency of the decryption algorithm.

The above and other objects, features and advantages will be made apparent by the detailed description below.

A plurality of component elements are described below, and each means may be configured of either hardware or software, or a combination of hardware and software.

In order to solve the problems described above, the present invention provides the following means:

(1) As a first solving means, according to this invention, there is provided an information processing apparatus for accessing memory spaces including a user memory space and a secure memory space, comprising component elements having the functions of a general purpose register, a secure information unit, a data control unit and an address control unit. The general purpose register is used for the CPU operation and has the function of receiving, delivering and storing the data. The secure information unit added to the general purpose register is set to the state not requiring security in the case where the data is transferred to the data unit of the general purpose register from the user memory space, and is set to the state requiring security in the case where the data is transferred from the secure memory space to the data unit of the general purpose register. The data control unit determines whether the value of the secure information unit is in the state requiring security or the state not requiring security when writing the data of the general purpose register in the user memory space, and determines whether the data transfer to the user memory space is to be prohibited or not. The address control unit has the function of determining which of the user memory space and the secure memory space is indicated by the address information and selecting the value of the secure information unit.

The operation of the configuration described above is described below. In the case where the data are stored in a general purpose register by the CPU operation, the address control unit checks which memory space the data is associated with. In the case where the data is read from the user memory space, the address control unit sets the secure information unit to the state requiring no security. In the case where the data are read from the secure memory space, on the other hand, the secure information unit is set to the state requiring security. When transferring the data of the general purpose register to the user memory space, the data control unit checks the secure information unit, and in the case where the state requiring no security prevails, the data transfer is allowed. In the case where the state requiring security prevails, on the other had, the data transfer is prohibited.

As described above, the data duplication from the secure memory space to the user memory space through the register by the user program can be prohibited. In other words, the decoding (hacking) of the secure program is prevented simply by adding a bit constituting the secure information unit to the general purpose register without changing the instruction set of the CPU. Nor is it necessary to switch between the privileged mode and the normal mode.

(2) In executing the secure program in the secure memory space, assume that the input contents are decoded and transferred to the user memory space. The data transfer occurs from the secure memory space to the user memory space. The data transfer from the secure memory space to the user memory space occurs also in the case where the function used for program execution is required to be accessed to save the required data temporarily in the user memory space. If the data transfer is prohibited in such a case, the specific operation of the secure program would be limited. Therefore, the transfer by the user program and the transfer by the secure program are required to be discriminated from each other. This protective measure is provided by the second solving means described below.

To provide the second solving means, the information processing apparatus according to the invention comprises, in addition to the component parts of the first solving means described above, the functions including an instruction fetch address control unit, an instruction buffer, a user program and a secure program. The instruction fetch address control unit has the function of determining which of the user memory space and the secure memory space is indicated by the address information when storing the instruction code input from the data control unit, and notifying the data control unit which of the user program and the secure program is executed. The instruction buffer is used for processing the instruction fetch by the CPU, and has the function of storing the instruction code input from the data control unit therein. The user program is arranged in the user memory space and generated mainly by the user. The secure program, which is arranged in the secure memory space, is generated mainly by the developer and not disclosed to the user. Further, the data control unit, when transferring the data from the data unit of the general purpose register to the memory spaces in compliance with a transfer instruction, prohibits the data transfer to the user memory space, in the case where the instruction fetch address control unit determines that the instruction is fetched from the user memory space and the value of the secure information unit is in the state requiring security.

The operation of the configuration described above is explained. When transferring the data in the general purpose register to the user memory space, the instruction fetch address control unit checks which memory space the particular transfer instruction has been fetched from. In the case where the instruction is fetched from the secure memory space, the instruction fetch address control unit informs the data control unit, which in turn permits the data transfer from the general purpose register to the user memory space. When fetching the instruction from the user memory space, on the other hand, the instruction fetch address control unit informs the data control unit, which in turn prohibits the data transfer from the general purpose register to the user memory space.

As described above, in the case where the developer develops a secure program in the secure memory space, the privilege is granted to freely load/store the data between the user memory space and the secure memory space. In the case where the user develops a user program in the user memory space, on the other hand, the data transfer from the secure memory space to the user memory space may be prohibited. In other words, the right to freely handle the data in the secure memory space can be discriminated by the secure program and the user program.

(3) With the first solving means described above, it is possible to prohibit the data transfer from the secure memory space to the user memory space through the general purpose register by the user program. Nevertheless, the process is not prohibited in which the result of the operation which may be executed between general purpose registers, for example, is stored in a new register and further in the user memory space. The possibility remains, therefore, that the data in the secure memory space is easily estimated by a dummy operation in which the result of the AND operation between the data read from the secure memory space into the register and the data of all "1" is stored in another register. Therefore, the data usable for the operation of the user program is required to be limited. This protective measure is provided by the third solving means described below.

In the third solving means, the information processing apparatus according to the invention comprises, in addition to the component parts of the second solving means, the functions including a plurality of general purpose registers, a plurality of secure information units and general purpose register files. The plurality of the general purpose registers are used to conduct the operation of the CPU, receive and deliver the data from and to the data control unit, and store the data therein. The plurality of the secure information units are each added to the corresponding one of the general purpose registers to set the value of the state requiring security, the status not requiring security and the state of invalid security under the control of the address control unit. The general purpose register files have such a function that in the operation executed between two or more registers using each of the general purpose registers in compliance with the operation instruction, the secure information unit of the general purpose register for storing the result of the arithmetic operation is set to the state of invalid security in the case where the value of the secure information unit of at least one of the general purpose registers is in the state requiring security. Further, the data control unit is so configured as to prohibit the arithmetic operation in the case where the instruction fetch address control unit determines that the operation instruction is fetched from the user memory space when the secure information unit issues the operation instruction to the general purpose register in the state of invalid security.

The operation of the aforementioned configuration follows. Specifically, in accordance with whether the data stored in the general purpose register and used for the arithmetic operation are derived from the secure memory space or the user memory space, the secure information unit is set to the state requiring security or the state not requiring security. In the case where at least one secure information unit is set to the state requiring security when issuing an operation instruction, the general purpose register file sets the secure information unit storing the operation result to the state of invalid security and notifies the data control unit. The data control unit thus notified prohibits the arithmetic operation.

As described above, with regard to the contents of the register storing the data of the secure memory space, the undesirable manipulation by the operation according to the user program (for example, the dummy operation in which the result of the AND operation between the data read from the secure memory space into the register and the data of all "1" is stored in another register) is prevented. As a result, the contents stored in the secure memory space are prevented from being estimated and thereby the secure program is prevented from being decoded (hacked).

(4) In the case where registers of two or more values are compared to each other by the user program, the data in the secure memory space can be easily estimated by accessing a status register holding the result of the comparative operation without knowing the operation result. Many CPUs usually have a status register. Therefore, the operation using the status register according to the user program is required to be limited. This protective measure is provided by the fourth solving means described below.

As the fourth solving means, the information processing apparatus according to the invention further comprises, in addition to the component parts of the second solving means described above, a status register having the following functions. Specifically, the status register is used for the arithmetic operation of the CPU and has the function of holding the value of the result of comparative operation as a comparative flag. In performing the operation between two or more general purpose registers in compliance with an operation instruction, the value of each flag is not changed in the case where the value of the secure information unit of at least one general purpose register is in the status requiring security and the instruction fetch address control unit determines that the operation instruction has been fetched from the user memory space.

The operation of this configuration is as follows. Specifically, in accordance with whether the data stored in the general purpose register and used for comparison are derived from the secure memory space or the user memory space, the secure information unit is set in the state requiring security or the state not requiring security. Upon issue of a comparison instruction, the status register prohibits the comparative flag from being changed in the case where at least one of the secure information units is in the state requiring security.

As described above, even in the case where the user program makes the registers having two or more values using the status register holding the value of the result of the comparative operation as a comparative flag, the estimation by comparison of the contents of the registers storing the data of the secure memory space is prevented and thus the secure program is prevented from being decoded.

(5) In (1) to (4) above, in the case where the developer debugs the secure program with the user system, the secure program is required to be monitored in the user memory space. In the process, the debug would be impossible if the data transfer from the secure memory space to the user memory space is prohibited. It is therefore necessary to cancel the function of prohibiting the data transfer through the register. This protective measure is provided by the fifth solving means described below.

In the fifth solving means, the information processing apparatus according to the invention comprises, in addition to the component parts of the second solving means, the functions including a user IO space, a secure IO space, an IC card and a debug key. The user IO space is a read/write IO space used for accessing the user memory space from outside. The secure IO space is a read/write IO space used for accessing the secure memory space from outside. The IC card is used connected to the secure IO space and has the function of storing the data including the debug key therein. The debug key is stored in the IC card and has the function of stopping the address determination function of the instruction fetch address control unit and the address control unit when the developer debugs the secure program for the user system and the program is read into the CPU through the secure IO space. Further, the data control unit is so configured that in the case where the debug key is read into the CPU when transferring the data from the data unit of the general purpose register to the memory spaces in response to a transfer instruction, the data transfer to the user memory space is not prohibited regardless from which of the user memory space and the secure memory space the instruction is fetched.

The operation of this configuration is as follows. Specifically, in the case where the CPU starts the debug operation with the IC card connected with the secure IO space, the debug key is read from the IC card and loaded into the CPU through the secure IO space, once the debug key is loaded, the address discrimination function of the instruction fetch address control unit and the address control unit is stopped. In the case where an instruction is fetched from the user memory space with the debug key not loaded, therefore, the data transfer to the user memory space from the general purpose register is prohibited. In the case where the debug key is loaded and the address discrimination function is stopped, however, the prohibition described above fails to work, and the data transfer from the general purpose register to the user memory space is permitted regardless of from which of the secure memory space and the user memory space the instruction is fetched.

As described above, in the case where the developer debugs the secure program with the user system, the function of the additional bit of the secure information of the general purpose register is stopped, and free data transfer becomes possible between the user memory space and the secure memory space, thereby making it possible to monitor the secure program. Specifically, even in the user environment, the developer can easily debug the secure program with the IC card having the debug key stored therein, and thus can acquire the right equivalent to the conventional privileged mode.

(6) As sixth solving means, the information processing apparatus according to the invention adapted to access memory spaces including a user memory space and a secure memory space, comprises the component elements having the functions of a secure information generating unit, a general purpose register with secure information, a built-in RAM space with secure information and a data output control unit.

The secure information generating unit determines which of the user memory space and the secure memory space is indicated by the address information, and delivers the data with the secure information into the GENERAL PURPOSE REGISTER. The general purpose register has the function of receiving and holding the data with secure information. The built-in RAM space receives and holds the data with secure information from the general purpose register on the one hand and delivers the data thus held to the general purpose register at the same time. The data output control unit has the function of transferring the data to an external space by the secure information. The data output control unit further has the function of determining whether the data transfer to the external space is to be prohibited or not, by the value of the secure information set in the general purpose register.

The operation of this configuration is as follows. Specifically, when the data is transferred from the memory spaces to the general purpose register, the secure information generating unit checks to see which of the user memory space and the secure memory space is associated with the address information, generates a corresponding secure information and stores it with the data in the general purpose register. When the data of the general purpose register is written in the built-in RAM space, the particular data are written with the secure information at the same time. Also, the data in the built-in RAM space is written in the general purpose register with the secure information for the particular data. As a result, the secure information of the data is held. When the data of the general purpose register is transferred to an external space, the data output control unit checks the secure information of the particular data and in the case where the secure information indicates that the data is derived from the user memory space, permits the transfer of the particular data. In the case where the secure information indicates that the data is derived from the secure memory space, on the other hand, the data transfer is prohibited.

As described above, the data transfer from the secure memory space to an external space by the user program through the register can be prohibited. In this way, the decoding (hacking) of the secure program is prevented. In this case, the only need is to add a bit to the general purpose register as secure information, and the instruction set of the CPU is not required to be changed. Also, no switching operation is required between the privileged mode and the normal mode.

Further, the security management of the data through the built-in RAM space is made possible, and since the secure information is added to the data, the data of the secure memory space and the data of the user memory space are allowed to coexist in the built-in RAM space. In compliance with the instruction of the user memory space, the secure data on the built-in RAM space is permitted to be rewritten. Thus, the security management of the built-in RAM space is made possible without affecting the normal use.

(7) As seventh solving means, the information processing apparatus according to the invention for accessing memory spaces including a user memory space and a secure memory space comprises the component elements having the functions described below. Specifically, the information processing apparatus comprises a secure information generating unit, a general purpose register with secure information, an instruction decoder with secure information, a built-in RAM space with secure information, an interrupt save information unit with secure information and a data output control unit. The secure information generating unit determines which of the user memory space and the secure memory space is indicated by the address information, and delivers the data and instructions with secure information added thereto into the GENERAL PURPOSE REGISTER. The general purpose register has the function of receiving and holding the data with secure information. The instruction decoder has the function of determining whether the instruction under execution is the one derived from the user memory space or the one derived from the secure memory space. The built-in RAM space has the function to receive and hold the data with secure information from the general purpose register and also to deliver the data thus held to the general purpose register. The interrupt save information unit has the function of adding the secure information of the instruction decoder to the data saved in the stack area of the built-in RAM space. The data output control unit has the function of controlling the data transfer to the external space by the secure information. Further, the data output control unit is configured in such a manner as to determine whether or not the data transfer to the external space is to be prohibited by the value of the secure information set in the general purpose register.

The operation of the configuration described above is as follows. Specifically, when the data and/or the instruction is transferred from the memory spaces to the general purpose register, the secure information generating unit checks to see from which of the user memory space or the secure memory space the address information is derived, generates the secure information corresponding to each space, and stores the data with secure information in the general purpose register. Also, the instruction decoder holds the decoded instruction with secure information. In the case where the event of an interrupt or the like occurs during the execution of the instruction, the interrupt save information unit saves the data in the stack area of the built-in RAM space. In the process, the secure information of the instruction decoder is added to the data saved. In this way, the secure information of the saved data is held. When transferring the data of the general purpose register to the external space, the data output control unit checks the secure information of the particular data, and in the case where the secure information indicates that the data is derived from the user memory space, the data transfer is permitted, while in the case where the secure information indicates that the data is derived from the secure memory space, on the other hand, the data transfer is prohibited.

As described above, by adding the secure information to the data saved in the built-in RAM space by an interrupt or the like, the security management is made possible in reading the data automatically saved in the built-in RAM space. Thus, the important task of defense against hacking in the secure memory space is made possible.

(8) As an eighth solving means, the information processing apparatus according to the invention for accessing memory spaces including a user memory space and a secure memory space comprises the component elements having the functions described below. The component elements include a secure information generating unit, a general purpose register with secure information, an instruction decoder with secure information, a built-in RAM space with secure information, an interrupt save information unit with secure information, a stack pointer and a save information rewrite control unit. The secure information generating unit determines which of the user memory space and the secure memory space is indicated by the address information, and delivers the data and the instruction with secure information into the GENERAL PURPOSE REGISTER. The general purpose register has the function of receiving and holding the data with secure information. The instruction decoder has the function of determining whether the instruction under execution is the one derived from the user memory space or the one derived from the secure memory space. The built-in RAM space has the function to receive and hold the data with secure information from the general purpose register and also to deliver the data thus held to the general purpose register. The interrupt save information unit has the function of adding, when an event of an interruption or the like occurs, the secure information of the instruction decoder to the data saved in the stack area of the built-in RAM space. The stack pointer defines a part of the built-in RAM space as a stack area. The save information rewrite control unit controls the rewrite operation of the stack area of the built-in RAM space. Further, in the case where the instruction of the instruction decoder is derived from the user memory space and intended to rewrite the stack area of the built-in RAM space, the save information rewrite control unit prohibits the rewrite operation.

The operation of this configuration is as follows. Specifically, the save information rewrite control unit checks the instruction of the instruction decoder and in the case where the instruction of the instruction decoder is derived from the user memory space and intended to rewrite the stack area of the built-in RAM space, prohibits the rewrite operation.

As described above, the return address to the secure memory space saved in the built-in RAM space is prohibited from being rewritten in response to the instruction of the user memory space by a user interrupt or the like during the execution of the instruction of the secure memory space. As a result, the normal restoration of the secure memory space is guaranteed, while at the same time limiting the access to the secure memory space by the instruction of the user memory space. In addition, the security management of the stack area is made possible by switching the rewrite control operation by the space indicated by the stack pointer without physically dividing the normal area and the stack area of the built-in RAM space.

(9) As a ninth solving means, the information processing apparatus according to the invention for accessing memory spaces including a user memory space and a secure memory space comprises the component elements having the functions described below. Specifically, the information processing apparatus comprises a DMA with secure information, a secure information generating unit, a built-in RAM space with secure information and a data output control unit. The secure information generating unit determines which of the user memory space and the secure memory space is indicated by the address information, and delivers the data with secure information into the DMA. The built-in RAM space has the function to receive and hold the data with secure information from the DMA and also to deliver the data thus held to the DMA. The data output control unit has the function of controlling the data transfer to the external space by the secure information. Further, the data output control unit is configured in such a manner as to determine whether or not the data transfer to the external space is prohibited by the value of the secure information set in the DMA.

The operation of the configuration described above is as follows. Specifically, the security management of the data through the DMA is made possible by causing the secure information to follow the DMA data transferred not through the CPU. Also in the case where the data and the instructions in the secure memory space are used by being developed in the built-in RAM space by the DMA, the security management of the data and the instructions in the secure memory space is made possible. Also in the case where the data and the instructions in the built-in RAM space are transferred to the external space by the DMA, the security management of the data and the instructions in the secure memory space is made possible.

(10) As a tenth solving means, the information processing apparatus according to the invention for accessing memory spaces including a user memory space and a secure memory space comprises the component elements having the functions described below. Specifically, the information processing apparatus comprises a secure information generating unit, a general purpose register with secure information, an instruction decoder with secure information, an operating unit with secure information and a data output control unit. The secure information generating unit determines which of the user memory space and the secure memory space is indicated by the address information, and delivers the data and instructions with secure information into the GENERAL PURPOSE REGISTER. The general purpose register has the function of receiving and holding the data with secure information. The instruction decoder has the function of determining whether the instruction under execution is the one derived from the user memory space or the one derived from the secure memory space. The operating unit has the function of reflecting the secure information of the instruction decoder in the arithmetic operation executed in accordance with an instruction decoded in the instruction decoder. The data output control unit has the function of controlling the data transfer to the external space by the secure information. Further, the data output control unit is configured in such a manner as to determine whether or not the data transfer to the external space is prohibited or not by the secure information set in the general purpose register and the secure information set in the operating unit.

The operation of the configuration described above is as follows. Specifically, this configuration provides a protective means against the leakage of the result of the arithmetic operation into the external space. In the case where an instruction of the secure memory space for performing the arithmetic operation is executed without any secure information in the arithmetic operation result, the particular arithmetic operation result is liable to be read out into the external space. Even in the case where all the data to be arithmetically operated are derived from the user memory space or the secure data is not expressly indicated in the secure information unit, therefore, the secure information added to the instruction of the secure memory space is reflected in the secure information of the operating unit. By doing so, the arithmetic operation result is prevented from flowing out into the external space, and the estimation of the contents of the instruction of the secure memory space from the arithmetic operation result is prevented.

The foregoing and other aspects will become apparent from the following description of the invention when considered in conjunction with the accompanying drawings.

BRIEF DESCRIPTION OF THE DRAWINGS

FIG. 14 a schematic diagram showing a configuration of an information processing apparatus according to a seventh embodiment of the invention;

FIG. 18 is a schematic diagram showing a configuration of an information processing apparatus according to a ninth embodiment of the invention;

In all these figures, like components are indicated by the same numerals.

DESCRIPTION OF THE PREFERRED EMBODIMENTS

The information processing apparatus according to preferred embodiments of the invention is explained below with reference to the drawings.

First Embodiment

Figure 1:
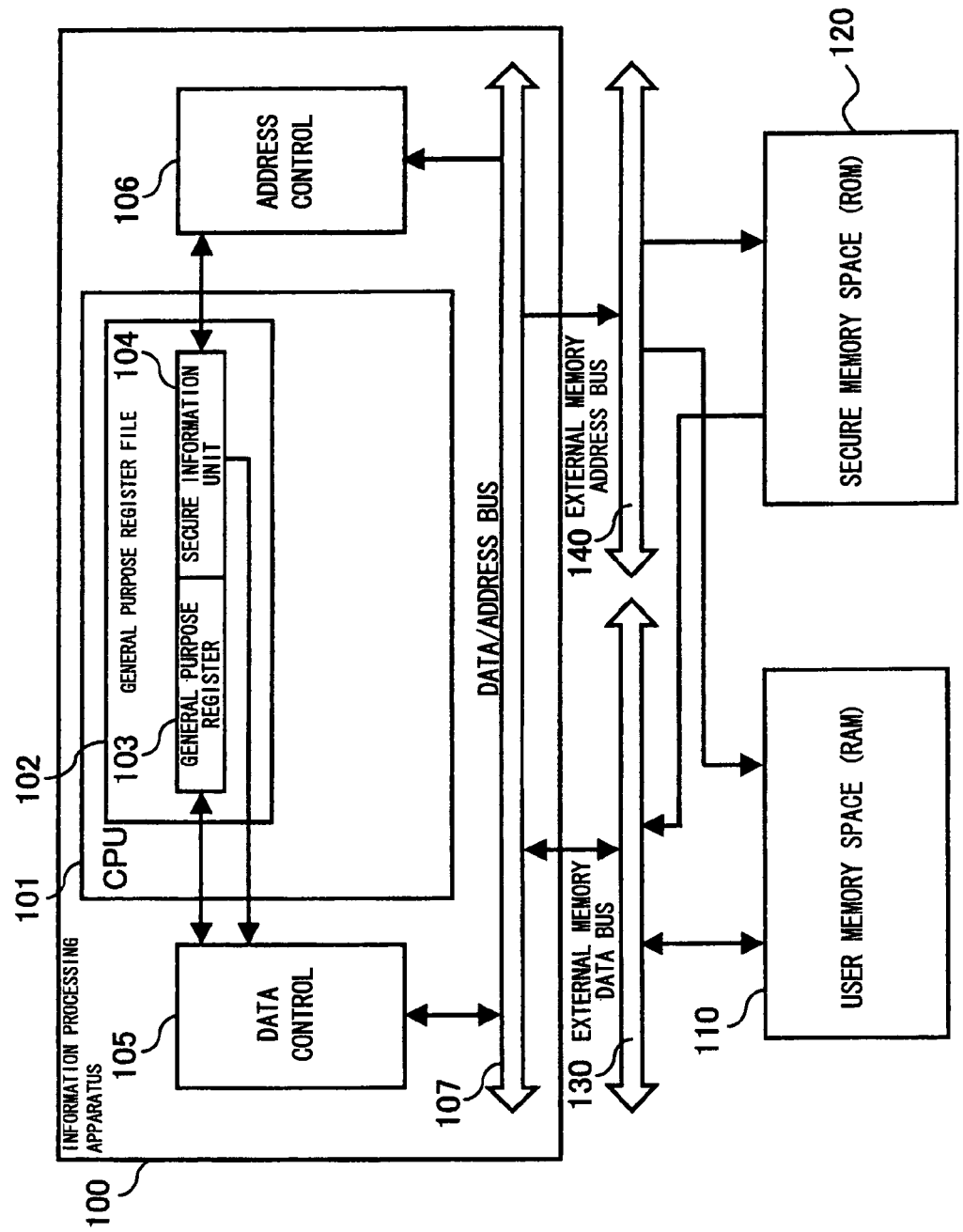
FIG. 1 is a schematic diagram showing a configuration of an information processing apparatus according to a first embodiment of the invention.

FIG. 1 is a schematic diagram showing a configuration of an information processing apparatus according to a first embodiment of the invention. In FIG. 1, reference numeral 100 designates an information processing apparatus, numeral 101 a CPU, numeral 102 a general purpose register file, numeral 103 a general purpose register, numeral 104 a secure information unit, numeral 105 a data control unit, numeral 106 an address control unit, numeral 107 a data/address bus, numeral 110 a user memory space (RAM), and numeral 120 a secure memory space (ROM). Of these component parts, the information processing apparatus 100 represents the whole block of the apparatus connected externally with a user memory space 110 and a secure memory space 120.

The CPU 101 has the general purpose register file 102, and by accessing the user memory space 110 and the secure memory space 120, reads and writes the data from and into the general purpose register 103. The general purpose register file 102 has the general purpose register 103 and the secure information unit 104 corresponding thereto. The general purpose register 103 is used for the arithmetic processing by the CPU 101, and has the function of receiving and delivering the data from and to the data control unit 105 and storing the data therein. The secure information unit 104 is added to the general purpose register 103, and under the control of the address control unit 106, can be set to the value of the state requiring security or the state not requiring security.

The data control unit 105 writes the data input from the data/address bus 107 in the general purpose register file 102, and outputs the data received from the general purpose register file 102 to the data/address bus 107 and writes the particular data in the user memory space 110. The data control unit 105 has the function, in performing this write operation, to check the value of the secure information unit 104 and to perform the control operation as to whether the write operation is to be prohibited or not.

The address control unit 106 has the function of determining which of the user memory space 110 and the secure memory space 120 is indicated by the address information input from the data/address bus 107, and selecting the value of the secure information unit 104 in the general purpose register file 102.

The data/address bus 107 connects the data control unit 105, the address control unit 106, the external memory data bus 130 and the external memory address bus 140 to each other, and has the function of receiving and delivering the data or the address from and to them.

The user memory space 110 is a read/write memory, and has the function of inputting or outputting the data from and to the external memory data bus 130 by the address information input from the external memory address bus 140.

The secure memory space 120 is a read-only memory, and has the function of outputting the data to the external memory data bus 130 by the address information input from the external memory address bus 140.

The external memory data bus 130 has the function of receiving and delivering the data between the information processing apparatus 100 and the user memory space 110 or the secure memory space 120.

The external memory address bus 140 has the function of delivering the address information received from the information processing apparatus 100 to the user memory space 110 or the secure memory space 120.

Next, the operation of the information processing apparatus according to the first embodiment having this configuration is explained.

Figure 2:
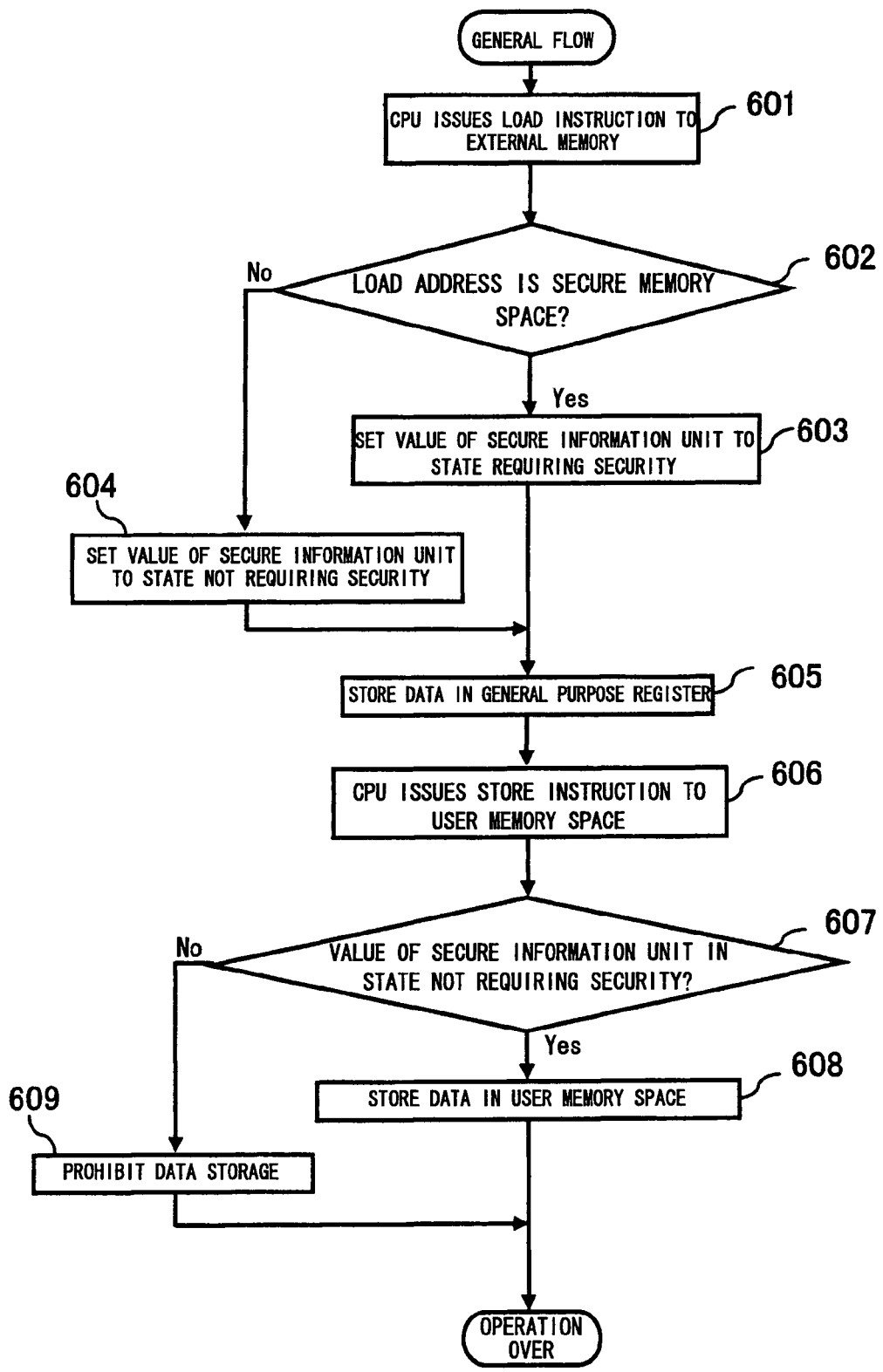
FIG. 2 is a flowchart showing the operation of the information processing apparatus according to the first embodiment of the invention.

FIG. 2 is a flowchart showing the operation of the first embodiment. In FIG. 2, numeral 601 designates the step of issuing a load instruction, numeral 602 the step of identifying a load address, numeral 603 the step of setting the state requiring security, numeral 604 the step of setting the state not requiring security, numeral 605 the step of storing the data in the general purpose register, numeral 606 the step of issuing a store instruction, numeral 607 the step of determining the security state, numeral 608 the step of storing the data in the user memory space, and numeral 609 the step of prohibiting the storage in the user memory space.

The step 601 of issuing a load instruction is to issue a load instruction to the external memory from the CPU 101. Upon completion of this step, the process proceeds to the step 602 of identifying the load address.

In the step 602 of determining the load address, the address control unit 106 determines whether the address information input from the data/address bus 107 is associated with the secure memory space 120 or not. This is to determine from which the data to be stored in the general purpose register 103 is to be read, the secure memory space 120 or the user memory space 110. In the case where it is determined that the data is derived from the secure memory space 120, the process proceeds to the step 603 of setting the state requiring security. Otherwise (i.e. in the case where the data is derived from the user memory space 110), the process proceeds to the step 604 of setting the state not requiring security.

The step 603 of setting the state requiring security is such that the address control unit 106 sets the value of the secure information unit 104 to the state requiring security. This step is executed in the case where the data to be stored in the general purpose register 103 is read from the secure memory space 120, in which case the operation is required to be set to the state requiring security. Upon completion of this step, the process proceeds to the step 605 of storing the data in the general purpose register.

The step 604 of setting the state not requiring security is such that the address control unit 106 sets the value of the secure information unit 104 to the state not requiring security. This step is executed in the case where the data to be stored in the general purpose register 103 is read from the user memory space 110, in which case the operation is set to the state not requiring security. Upon completion of this step, the process proceeds to the step 605 of storing the data in the general purpose register.

The step 605 of storing the data in the general purpose register is such that the CPU 101 stores in the general purpose register 103 the data received from the external memory through the external memory data bus 130, the data/address bus 107 and the data control unit 105. Upon completion of this step, the process proceeds to the step 606 of issuing a store instruction.

In the store instruction issue step 606, the CPU 101 issues a store instruction to the external memory. Upon completion of this step, the process proceeds to the security state determining step 607.

The security state determining step 607 is such that the data control unit 105 determines whether the value of the secure information unit 104 is in the state not requiring security or not. In the case where the result of determination shows the state not requiring security, the process proceeds to the step 608 of storing the data in the user memory space. Otherwise (i.e. in the case of the state requiring security), the process proceeds to the step 609 of prohibiting storage in the user memory space.

The step 608 of storing the data in the user memory space is such that the CPU 101 stores in the user memory space 110 the data received from the general purpose register 103 through the data control unit 105, the data/address bus 107 and the external memory data bus 130. Upon completion of this step, the operation is over.

The step 609 of prohibiting the data storage in the user memory space is such that the CPU 101 prohibits the storage, in the user memory space 110, of the data received from the general purpose register 103 through the data control unit 105, the data/address bus 107 and the external memory data bus 130. Upon completion of this step, the operation is over.

Specifically, the data are allowed to be transferred from either the user memory space or the secure memory space to the general purpose register. The data received from the user memory space is allowed to be transferred from the general purpose register to the user memory space, whereas the data received from the secure memory space is prohibited from being transferred from the general purpose register to the user memory space.

The aforementioned configuration can prohibit the data duplication from the secure memory space to the user memory space through the register by the user program. In this way, the decoding (hacking) of the secure program can be prevented. In this case, the feature of this embodiment lies in that the only need is to provide an additional bit representing the secure information unit in the register, but there is no need of changing the instruction set of the CPU. Nor is it necessary to switch between the privileged mode and the normal mode, thereby exhibiting the conspicuous effect of providing a protective means in simplistic fashion.

Second Embodiment

The first embodiment described above harbors the following problem. Specifically, in the case where the secure program is executed in the secure memory space, the data may be transferred from the secure memory space to the user memory space. In the fee-charging music distribution service, for example, the MP3 contents distributed are decoded and the decoded WAVE data are transferred to the user memory space. The need of data transfer from the secure memory space to the user memory space occurs also in the case where the function used at the time of program execution is accessed and the necessary data is required to be temporarily saved in the user memory space. The prohibition, if any, of the data transfer in such a case would pose the problem that the operation based on the secure program is limited. A new mechanism is necessary, therefore, to discriminate the transfer based on the user program and the transfer based on the secure program from each other. A protective measure against this problem is provided by the second embodiment of the invention. The configuration of the information processing apparatus according to the second embodiment is explained below.

Figure 3:
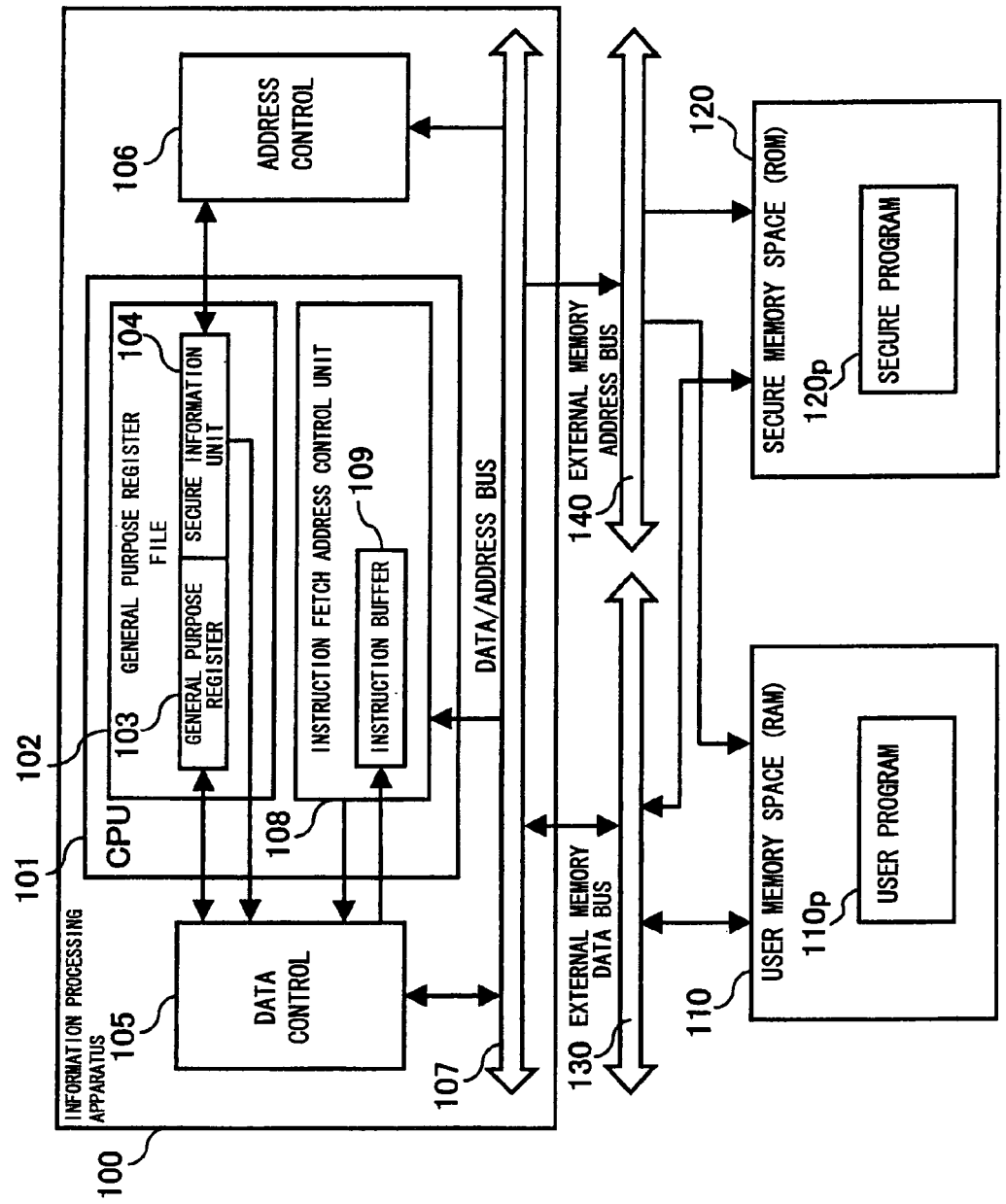
FIG. 3 is a schematic diagram showing a configuration of an information processing apparatus according to a second embodiment of the invention.

FIG. 3 is a schematic diagram showing the configuration of the information processing apparatus according to the second embodiment of the invention. In FIG. 3, similar blocks to those of the first embodiment shown in FIG. 1 are designated by the same reference numerals, respectively, and not described again.

Numeral 108 designates an instruction fetch address control unit, numeral 109 an instruction buffer, numeral 110p a user program, and numeral 120p a secure program.

The instruction fetch address control unit 108 has an instruction buffer 109 and determines which of the user memory space 110 and the secure memory space 120 is indicated by the address information input from the data/address bus 107 when the instruction code input from the data control unit 105 is stored in the instruction buffer 109. The instruction fetch address control unit 108 notifies the data control unit 105 which of the user program 110p and the secure program 120p is executed as the result of the determination.

The instruction buffer 109 is used for the instruction fetch process by the CPU 101, and has the function of storing therein the instruction code input from the data control unit 105.

The user program 110p is arranged in the user memory space 110 and generated mainly by the user.

The secure program 120p is arranged in the secure memory space 120 and generated mainly by the developer. The contents of the secure program 120p are not disclosed to the user.

Next, the operation of the information processing apparatus according to the second embodiment having the above-mentioned configuration is explained.

Figure 4:
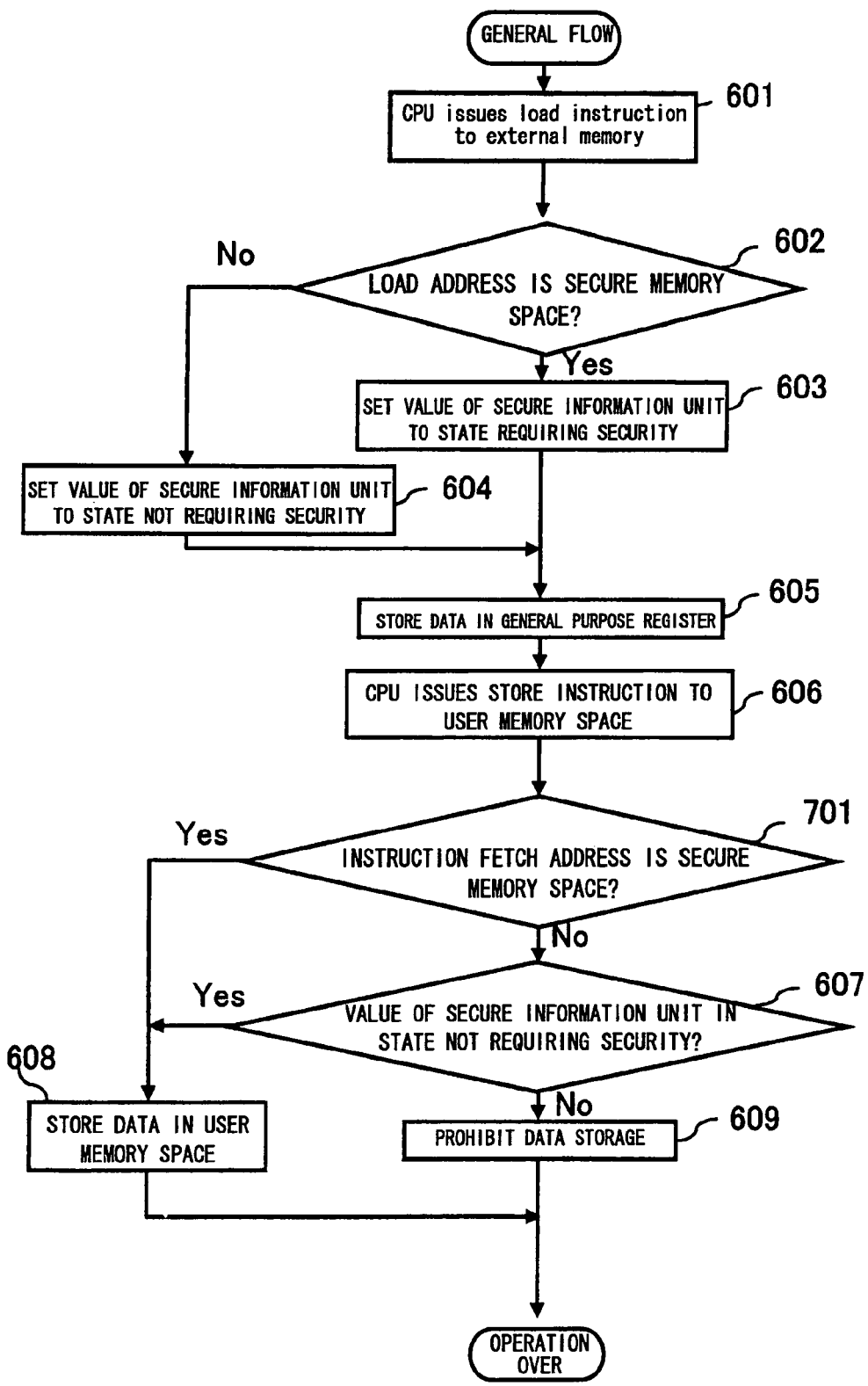
FIG. 4 is a flowchart showing the operation of the information processing apparatus according to the second embodiment of the invention.

FIG. 4 is a flowchart showing the operation of the second embodiment. In FIG. 4, the same steps as those explained in the first embodiments are designated by the same reference numerals, respectively, and not described again.

In the case where the data to be stored in the general purpose register 103 are read from the secure memory space 120, the secure information unit 104 is set in the state requiring security in step 603. In the case where the data to be stored in the general purpose register 103 are read from the user memory space 110, on the other hand, the secure information unit 104 is set in the state not requiring security in step 604.

Numeral 701 designates a load address determining step. In this step, the instruction fetch address control unit 108 determines whether the address information input from the data/address bus 107 is associated with the secure memory space 120 or not. This step is executed by determining with which of the secure program 120p in the secure memory space 120 and the user program 110p in the user memory space 110 the instruction is associated. In the case where the determination shows that the address information is derived from the secure memory space 120, the process proceeds to the step 608 of storing the data in the user memory space. Otherwise, the process proceeds to the step 609 of prohibiting the storage in the user memory space.

Specifically, in the case where the data read from the secure memory space into the general purpose register is mainly the secure program, and the particular secure program attempts to use the user memory space, the attempted use of the user memory space is permitted. In the case where the data read is mainly the user program and the particular user program attempts to use the user memory space, however, the attempted use of the user memory space is prohibited.

In the case where the secure program is developed in the secure memory space by the developer with the configuration described above, the privilege of freely loading/storing in the areas of the user memory space and the secure memory space can be granted. In the case where the user develops the user program in the user memory space, on the other hand, the data transfer from the secure memory space to the user memory space can be prohibited. In other words, the significant effect is achieved in which the right to freely handle the data in the secure memory space is differentiated between the secure program and the user program.

Third Embodiment

The first embodiment described above also poses the following problem. Specifically, the data transfer from the secure memory space to the user memory space through the general purpose register according to the user program can be prohibited. In the mutual arithmetic operation between the general purpose registers, however, the process of storing the result of the arithmetic operation in a new register and storing it in the user memory space is not prohibited. As an example, the problem is that the data in the secure memory space can be easily estimated by a dummy operation in which the data read from the secure memory space into the register and the data of all "1" are subjected to the AND operation and the result of the AND operation is stored in another register. It is necessary, therefore, to provide a new mechanism by which the data usable for the operation of the user program is limited. A protective measure against this problem is provided by the third embodiment of the invention. The configuration of the information processing apparatus according to the third embodiment is explained below.

Figure 5:
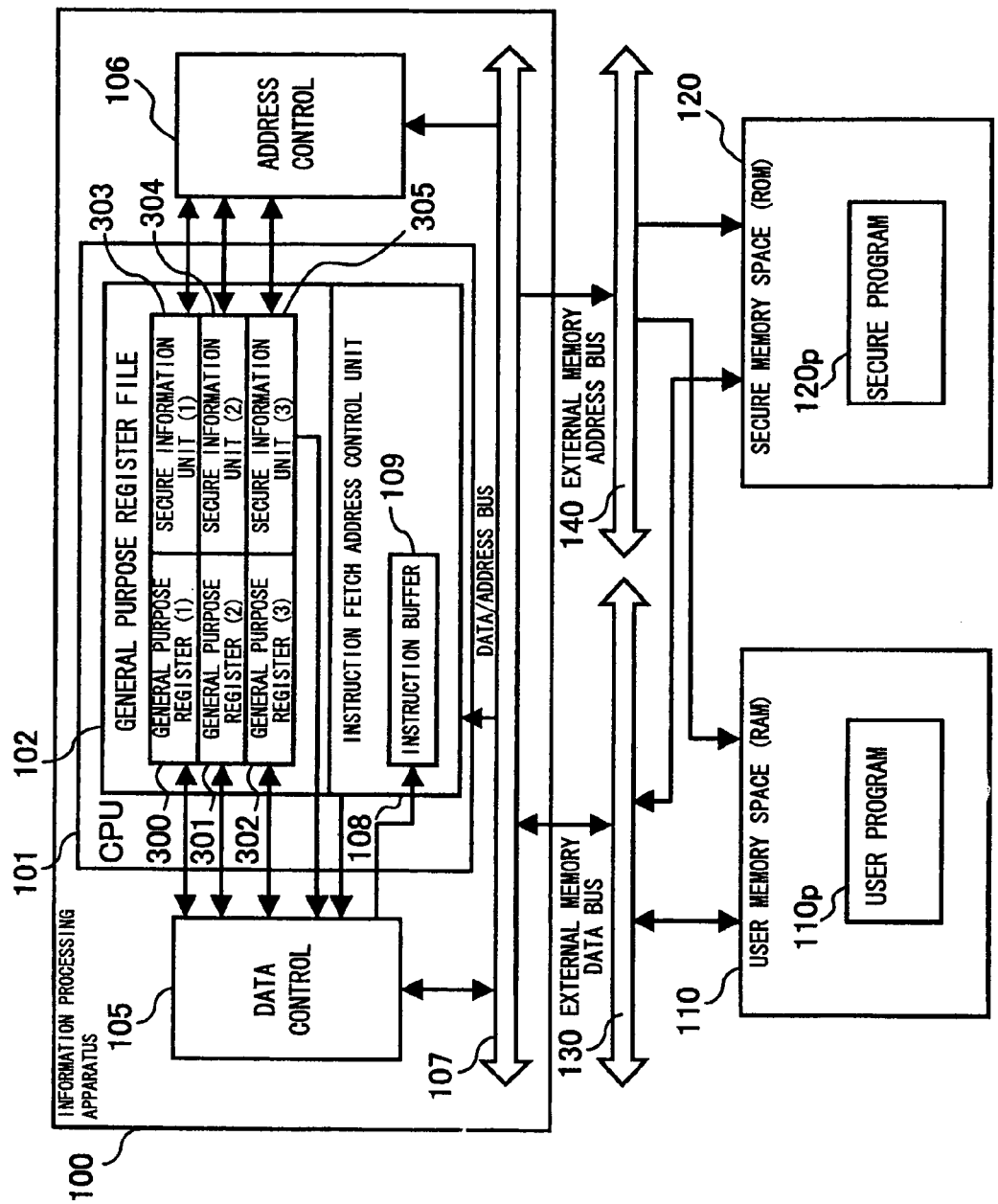
FIG. 5 is a schematic diagram showing a configuration of an information processing apparatus according to a third embodiment of the invention.

FIG. 5 is a schematic diagram showing a configuration of the information processing apparatus according to the third embodiment of the invention. In FIG. 5, the same blocks as those in FIGS. 1 and 3 described in the first and second embodiments are designated by the same reference numerals, respectively, and not described again.

Numeral 300 designates a first general purpose register, numeral 301 a second general purpose register, numeral 302 a third general purpose register, numeral 303 a first secure information unit, numeral 304 a second secure information unit, and numeral 305 a third secure information unit.

The first general purpose register 300, the second general purpose register 301 and the third general purpose register 302 are used for the arithmetic operation by the CPU 101 to receive and deliver the data from and to the data control unit 105 and have the function of storing the data therein.

The first secure information unit 303, the second secure information unit 304 and the third secure information unit 305 are added to the first general purpose register 300, the second general purpose register 301 and the third general purpose register 302, respectively, and under the control of the address control unit 106, can be set to the state requiring security or the state not requiring security or the state of invalid security.

Next, the operation of the information processing apparatus according to the third embodiment having the above-mentioned configuration is explained.

Figure 6:
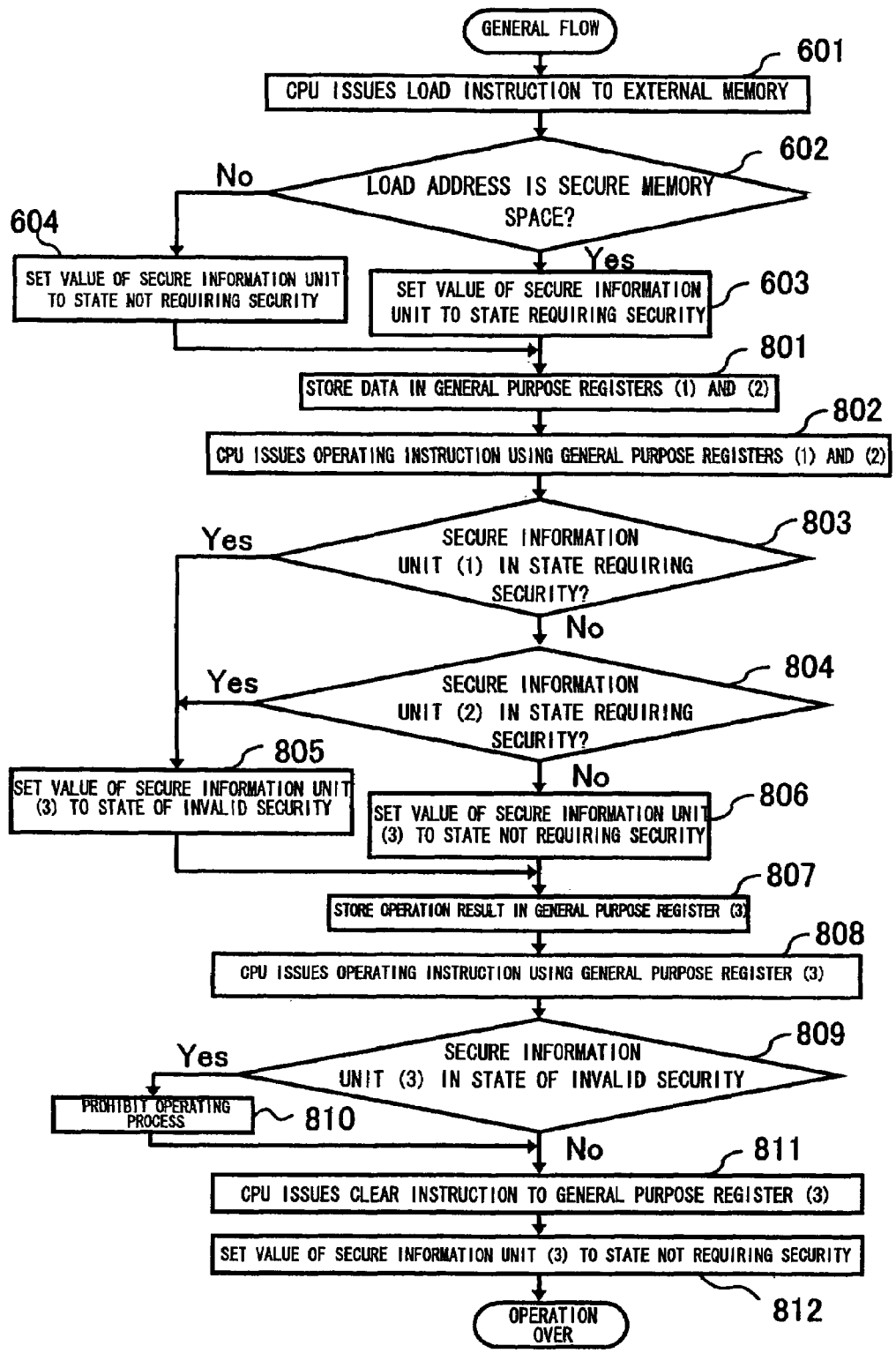
FIG. 6 is a flowchart showing the operation of the information processing apparatus according to the third embodiment of the invention.

FIG. 6 is a flowchart showing the operation of the third embodiment. In FIG. 6, the same steps as those in FIGS. 2 an 4 described in the first and second embodiments are designated by the same reference numerals, respectively, and not described again.

In the case where the data to be stored in one of the general purpose registers is read from the secure memory space 120, the corresponding secure information units are set in the state requiring security in step 603. In the case where the data to be stored in one of the general purpose registers is read from the user memory space 110, on the other hand, the secure information unit is set to the state not requiring security in step 604.

Numeral 801 designates the step of storing the data in the first and second general purpose registers, numeral 802 the step of the CPU issuing an arithmetic operation instruction using the first and second general purpose registers, numeral 803 the step of determining whether the first secure information unit is in the state requiring security or not, numeral 804 the step of determining whether the second secure information unit is in the state requiring security or not, numeral 805 the step of setting the third secure information unit to the value of invalid security, numeral 806 the step of setting the third secure information unit to the state of invalid security, numeral 807 the step of storing the result of the arithmetic operation of the third general purpose register, numeral 808 the step of the CPU issuing an instruction of the arithmetic operation using the third general purpose register, numeral 809 the step of determining whether the third secure information unit is in the state requiring security or not, numeral 810 the step of prohibiting the arithmetic operation, numeral 811 the step of the CPU issuing a clear instruction to the third general purpose register, and numeral 812 the step of setting the third secure information unit to the state not requiring security.

The step 801 of storing the data in the first and second general purpose registers is such that the CPU 101 stores the data received from the external memory through the external memory data bus 130, the data/address bus 107 and the data control unit 105 in the first general purpose register 300 and the second general purpose register 301. Upon completion of this step, the process proceeds to the step 802 of the CPU issuing the instruction for the arithmetic operation using the first and second general purpose registers.

The step 802 of the CPU issuing the instruction for arithmetic operation using the general purpose registers (1 and 2) is such that the CPU 101 executes some arithmetic operation (ADD, SUB, etc.) using the first general purpose register 300 and the second general purpose register 301. Upon completion of this step, the process proceeds to the step 803 of determining whether the first secure information unit is in the state requiring security or not.

In step 803, the data control unit 105 determines whether the value of the first secure information unit 303 is in the state requiring security or not. In the case where the result of this determination indicates that the first information unit 303 is in the state requiring security, the process proceeds to the step 805 of setting the third secure information unit to the state of invalid security. Otherwise (i.e. in the case of the state not requiring security), the process proceeds to the step 804 of determining whether the second secure information unit is in the state requiring security or not.

In step 804, the data control unit 105 determines whether the value of the second secure information unit 304 is in the state requiring security or not. In the case where the result of determination shows the state requiring security, the process proceeds to the step 805 of setting the third secure information unit in the state of invalid security. Otherwise (i.e. in the case of the state not requiring security), the process proceeds to the step 806 of setting the third secure information unit in the state not requiring security.

In step 805, the address control unit 106 sets the value of the third secure information unit 305 to the state of invalid security. Upon completion of this step, the process proceeds to the step 807 of storing the result of the arithmetic operation in the third general purpose register.

In steps 803 to 805, the value of the third secure information unit 305 is set to the state of invalid security in the case where at least one of the data stored in the first general purpose register 300 and the data stored in the second general purpose register 301 is read from the secure memory space 120.

In step 806, the address control unit 106 sets the value of the third secure information unit 305 to the state not requiring security. Upon completion of this step, the process proceeds to the step 807 of storing the result of the arithmetic operation in the third general purpose register.

In the process of steps 803 to 806, the value of the third secure information unit 305 is set to the state not requiring security in the case where both the data stored in the first general purpose register 300 and the data stored in the second general purpose register 301 are read from the user memory space 110.

In step 807, the result of the arithmetic operation of the first general purpose register 300 and the result of the arithmetic operation of the second general purpose register 301 are stored in the third general purpose register 302. Upon completion of this step, the process proceeds to the step 808 in which the CPU issues operating instructions.

The step 808 of issuing the CPU operation instruction using the third general purpose register is such that the CPU 101 executes some process (store, jump, etc.) for arithmetic operation using the third general purpose register 302. Upon completion of this step, the process proceeds to the step 809 of determining whether the third secure information unit is in the state requiring security or not.

In step 809, the data control unit 105 determines whether the value of the third secure information unit 305 is in the state of invalid security or not. In the case where the result of determination is in the state of invalid security, the process proceeds to the step 810 of prohibiting the arithmetic operation. Otherwise (i.e. in the state not requiring security or the state requiring security), the process proceeds to the step 811 in which the CPU issues a clear instruction to the third general purpose register.

In step 811, the CPU 101 executes the process of clearing (CLR) the third general purpose register 302. Upon completion of this step, the process proceeds to the step 812 for setting the third general purpose register to the state not requiring security.

In step 812, the address control unit 106 sets the value of the third secure information unit 305 to the state not requiring security. Upon completion of this step, the operation is over.

Specifically, in the case where the data is read from the secure memory space into the general purpose register and further the arithmetic operation is to be performed using the particular data, the arithmetic operation is prohibited by setting the value of the secure information unit 305 to the state of invalid security.

With the configuration described above, the contents of the registers storing the data derived from the secure memory space cannot be subjected to the arithmetic operation (i.e. arithmetic operation under the four rules, including ADD (+), SUB (−), MUL (×), DIV (÷)) according to the user program. As a result, the estimation of the contents stored in the secure memory space is prevented. Assuming that the dummy operation is allowed in which the result of the AND operation (for example, 8'b11010011 & 8'11111111=8'b11010011) between the data read from the secure memory space into the register and the data of all "1" is stored in another register, then the secure program may be decoded (hacked) through the estimation of the data in the secure memory space. According to this embodiment, however, a significant effect is exhibited in which the decoding of the secure program is prevented.

Fourth Embodiment

The first embodiment described above also poses the following problem. Specifically, by comparing the registers in binary or more digits according to the user program, the data in the secure memory space may be estimated easily by accessing a status register holding the result of the comparative arithmetic operation without knowing the result of the arithmetic operation. Substantially all of the many CPUs existing in this world have a status register. Therefore, a new mechanism is required to limit the arithmetic operation using the status register according to the user program. A protective measure is provided by the fourth embodiment of the invention. The configuration of the information processing apparatus according to the fourth embodiment is explained below.

Figure 7:
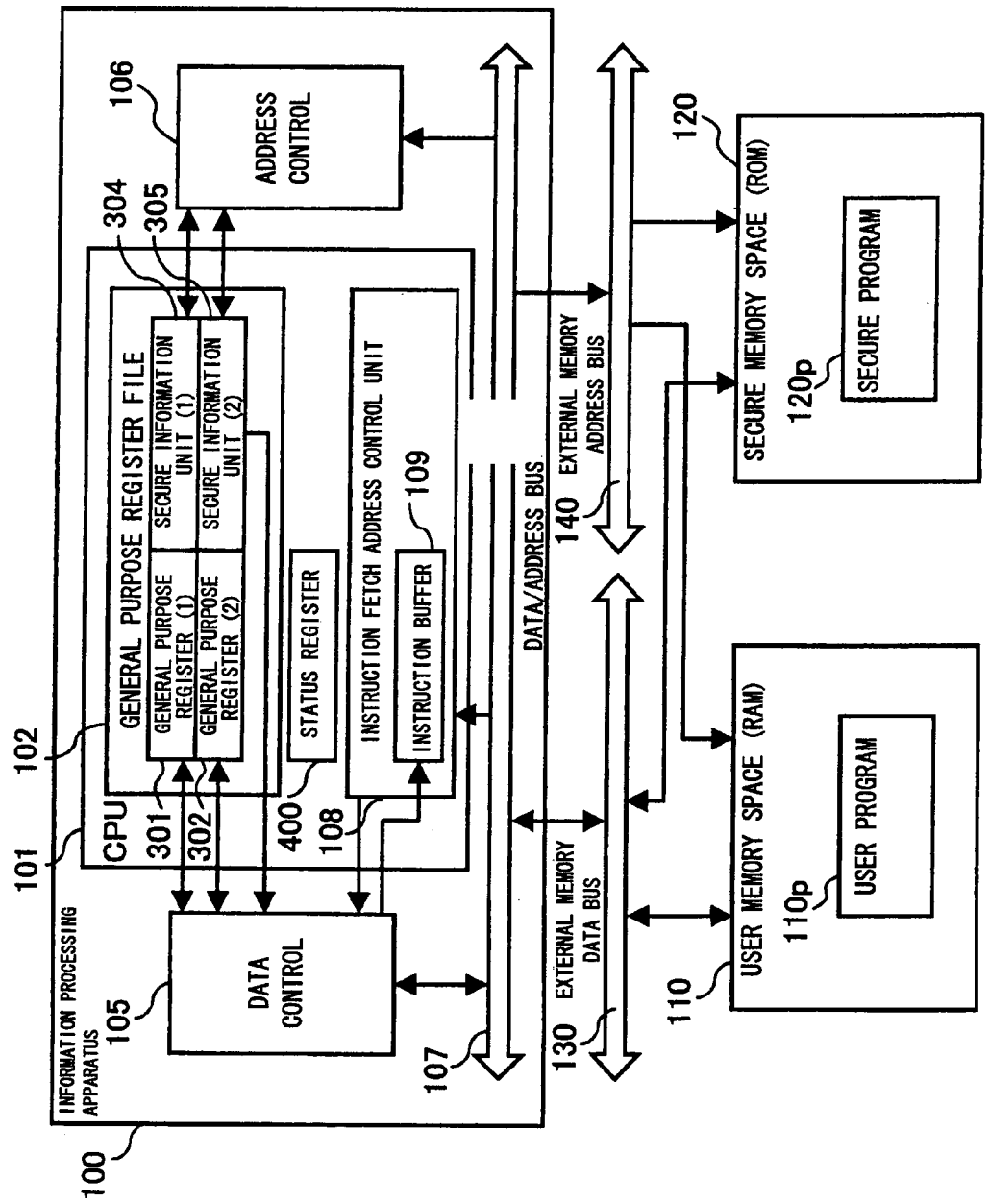
FIG. 7 is a schematic diagram showing a configuration of an information processing apparatus according to a fourth embodiment of the invention.

FIG. 7 is a schematic diagram showing a configuration of the information processing apparatus according to the fourth embodiment of the invention. In FIG. 7, the blocks similar to those of the first to third embodiments shown in FIGS. 1, 3 and 5 are designated by the same reference numerals, respectively, and not described again.

Numeral 400 designates a status register which is used for the arithmetic operation by the CPU 101 and has the function of holding the value of the result of the comparative arithmetic operation as a comparative flag.

Next, the operation of the information processing apparatus according to the fourth embodiment having this configuration is explained.

Figure 8:
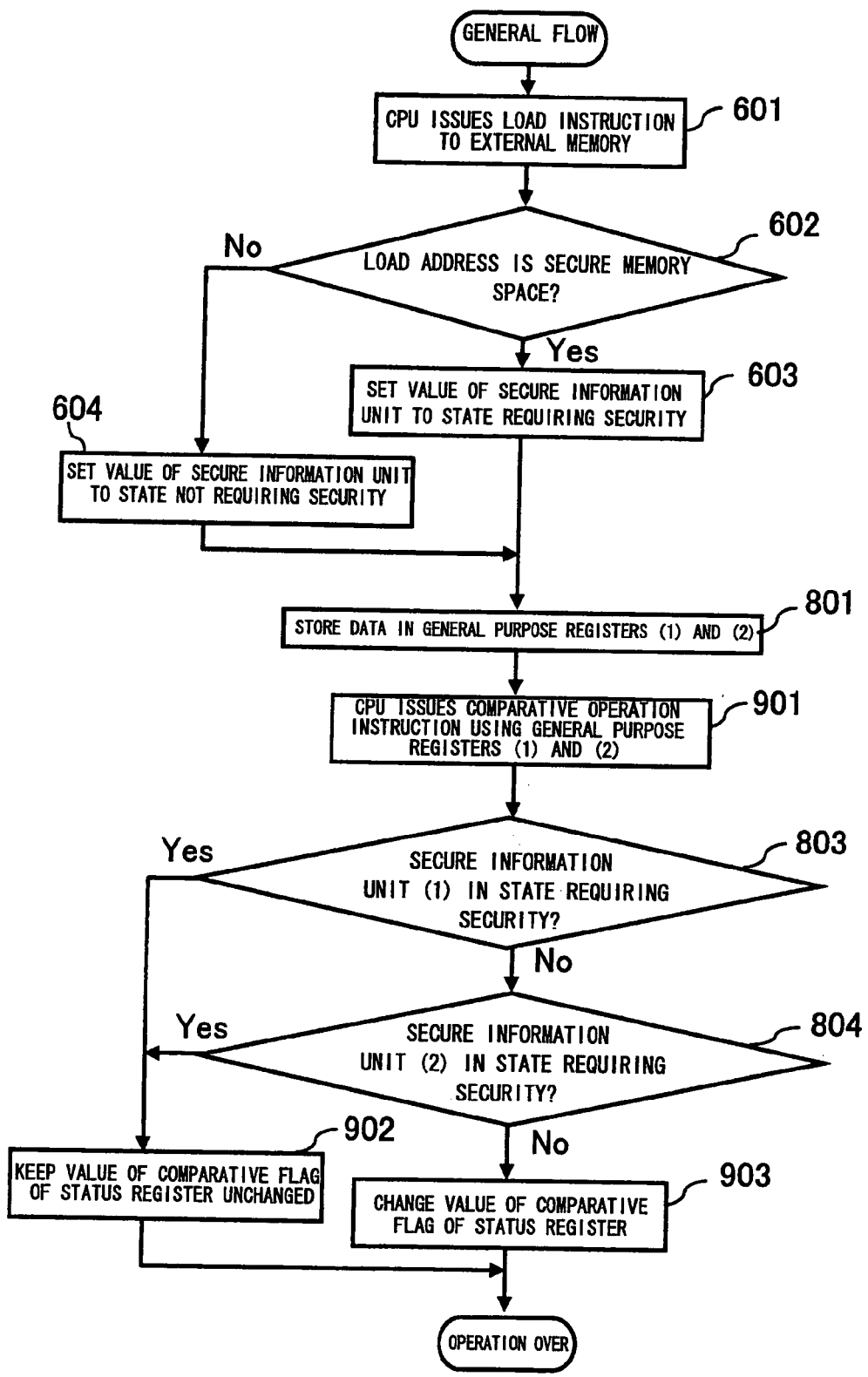
FIG. 8 is a flowchart showing the operation of the information processing apparatus according to the fourth embodiment of the invention.

FIG. 8 is a flowchart showing the operation of the fourth embodiment. In FIG. 8, the steps similar to those of the first to third embodiments shown in FIGS. 2, 4 and 6 are designated by the same reference numerals, respectively, and not described again.

In the case where the data to be stored in one of the general purpose registers is read from the secure memory space 120, the corresponding secure information unit is set to the state requiring security in step 603. In the case where the data to be stored in a given general purpose register is read from the user memory space 110, on the other hand, the secure information unit is set to the state not requiring security in step 604.

Numeral 901 designates the step of comparative arithmetic operation of the first and second general purpose registers, numeral 902 the step of prohibiting the change of the comparative flag of the status register, and numeral 903 the step of changing the comparative flag of the status register.

In step 901, the CPU 101 executes the process of comparative arithmetic operation (CMP, etc.) using the first general purpose register 300 and the second general purpose register 301. Upon completion of this step, the process proceeds to the step 803 of determining whether the first secure information unit is set to the state requiring security or not.

In the determining step 803, the data control unit 105 determines whether the value of the first secure information unit 303 is in the state requiring security or not, and in accordance with the result of determination, the process proceeds to step 902 or 804. In the determining step 804, the data control unit 105 determines whether the value of the second secure information unit 304 is in the state requiring security or not, and in accordance with the result of determination, the process proceeds to step 902 or 903.

In step 902, the value of the comparative flag of the status register 400 is prohibited from being changed in accordance with the result of the comparative arithmetic operation in the comparative arithmetic operation process 901 of the first and second general purpose registers. Upon completion of this step, the operation is over.

In steps 803, 804 and 902, the value of the comparative flag of the status register 400 is prohibited from being changed in the case where the at least one of the data stored in the first general purpose register 300 and the data stored in the second general purpose register 301 is read from the secure memory space 120.

In step 903, the value of the comparative flag of the status register 400 is changed in accordance with the result of the comparative arithmetic operation in the step 901 of comparative arithmetic operation between the first and second general purpose registers. Upon completion of this step, the operation is over.

In steps 803, 804 and 903, the value of the comparative flag of the status register 400 is allowed to be changed and the comparative arithmetic operation is permitted in the case where both the data stored in the first general purpose register 300 and the data stored in the second general purpose register 301 are read from the user memory space 110.

Specifically, in the case where the data are read from the secure memory space into a general purpose register, the comparison, which may be attempted using the particular data, is prohibited.

With this configuration, even in the case where the registers of binary or digits are compared using a status register holding the result of the comparative arithmetic operation as a comparative flag, the estimation of the register contents stored in the secure memory space by comparison is prevented. In other words, the significant effect of preventing the decoding of the secure program is exhibited.

Fifth Embodiment

In the case where the developer debugs the secure program for the user system in the first to fourth embodiments described above, the secure program is required to be monitored in the user memory space. The prohibition of data transfer from the secure memory space to the user memory space poses the problem that the debugging is impossible. A new mechanism is required, therefore, to cancel the function of prohibiting the data transfer through a register. A protective measure against this problem is provided by the fifth embodiment. The configuration of the information processing apparatus according to the fifth embodiment is described below.

Figure 9:
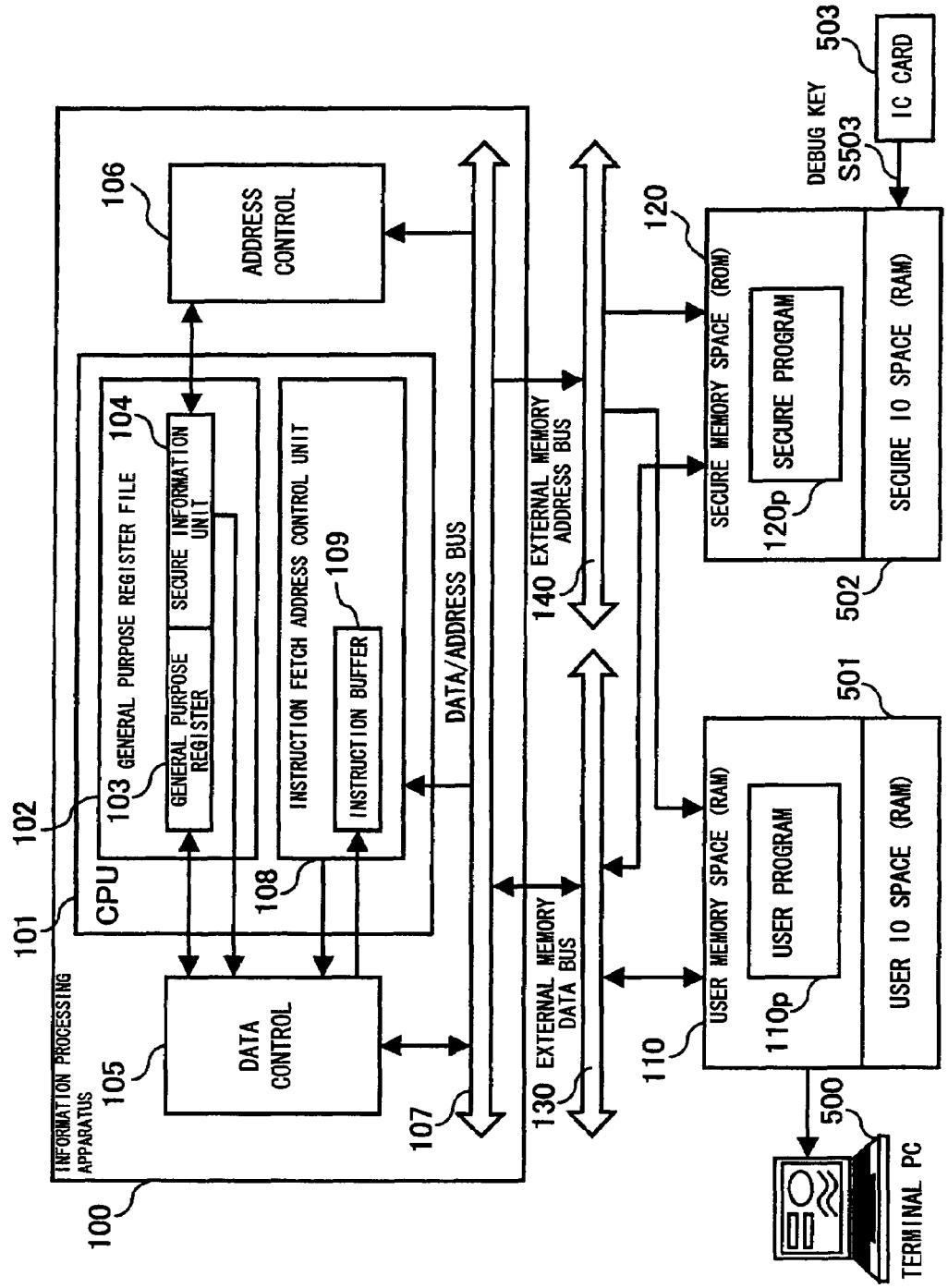
FIG. 9 is a schematic diagram showing a configuration of an information processing apparatus according to a fifth embodiment of the invention.

FIG. 9 is a schematic diagram showing a configuration of the information processing apparatus according to the fifth embodiment of the invention. In FIG. 9, the blocks similar to those described in the first to fourth embodiments shown in FIGS. 1, 3, 5 and 7 are designated by the same reference numerals, respectively, and not described again.

Numeral 500 designates a terminal PC, numeral 501 a user IO space (RAM), numeral 502 a secure 10 space (RAM), numeral 503 an IC card and numeral S503 a debug key.

The terminal PC 500 is used by the developer when debugging the secure program 120$p$ and connected to the user 10 space 501. This terminal PC 500 has the function of debugging the program to be debugged in the user memory space 110.

The user IO space 501 is a read/write space used for accessing the user memory space 110 from outside.

The secure IO space 502 is a read/write space used for accessing the secure memory space 120 from outside.

The IC card 503 is used connected with the secure 10 space 502 and has the function of storing the data such as the debug key S503 therein.

The debug key S503 is stored in the IC card 503, and when read out by the CPU 101 through the secure IO space 502 when the developer debugs the secure program 120$p$ for the user system, stops the address determining function of the instruction fetch address control unit 108 and the address control unit 106.

Next, the operation of the information processing apparatus according to the fifth embodiment having the above-mentioned configuration is explained.

Figure 10:
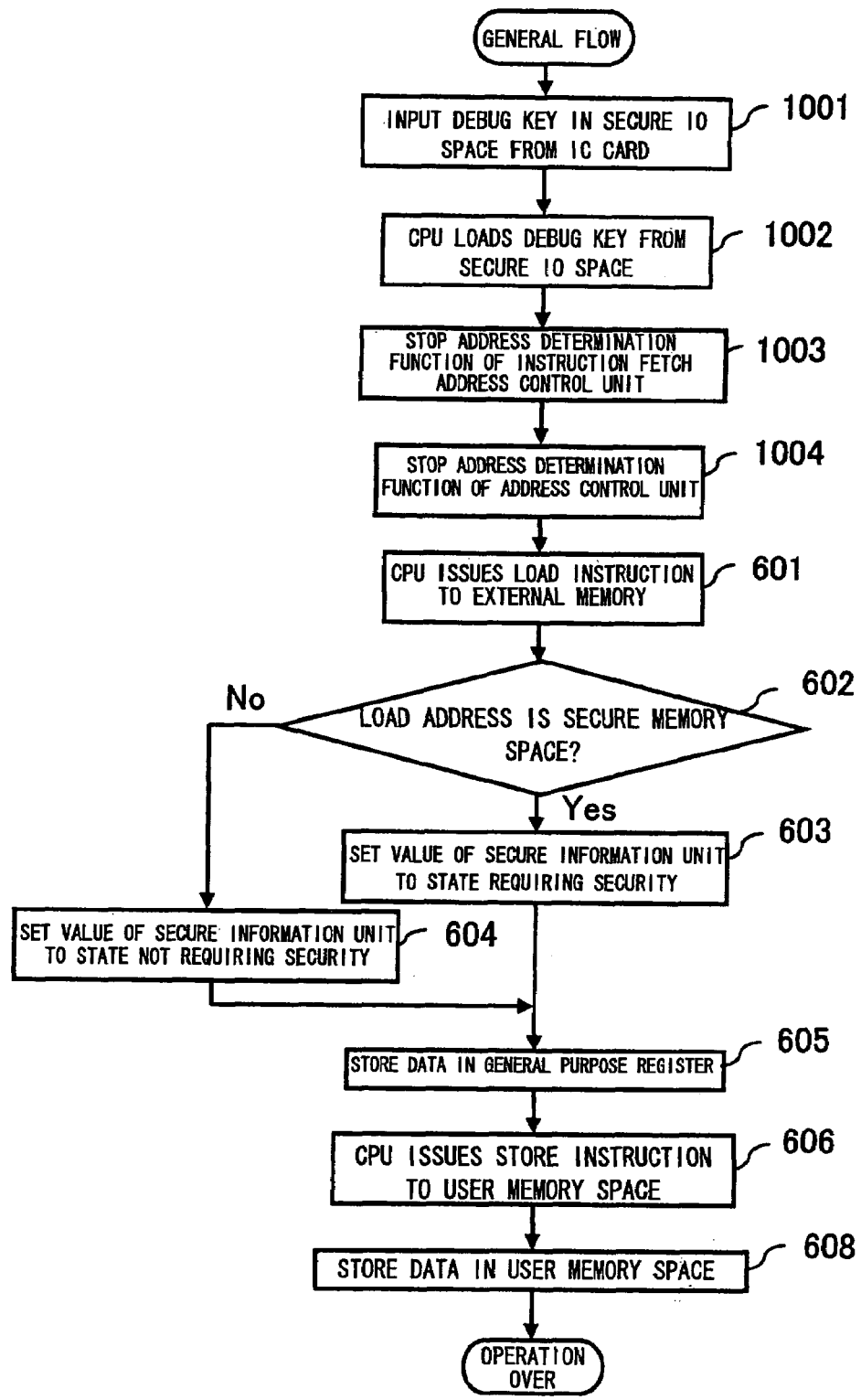
FIG. 10 is a flowchart showing the operation of the information processing apparatus according to the fifth embodiment of the invention.

FIG. 10 is a flowchart showing the operation of the fifth embodiment. In FIG. 10, the steps similar to those described in the first to fourth embodiments shown in FIGS. 2, 4, 6 and 8 are designated by the same reference numerals, respectively, and not described again.

Numeral 1001 designates the step of inputting the debug key, numeral 1002 the step of loading the debug key, numeral 1003 the step of stopping the instruction fetch address control unit, and numeral 1004 the step of stopping the address control unit.

The debug key input step 1001 is to input the debug key S503 from the IC card 503 into the secure IO space 502. Upon completion of this step, the process proceeds to the debug key load step 1002.

The debug key load step 1002 is such that the CPU 101 reads the debug key S503 from the secure IO space 502 through the external memory data bus 130, the data/address bus 107 and the data control unit 105. Upon completion of this step, the process proceeds to the step 1003 of. stopping the instruction fetch address control unit.

The instruction fetch address control unit stop step 1003 is to stop the function of the instruction fetch address control unit 108 to determine the address. Upon completion of this step, the process proceeds to the address control unit stop step 1004.

The address control unit stop step 1004 is to stop the function of the address control unit 106 to determine the address. Upon completion of this step, the process proceeds to the load instruction issue step 601.

Subsequently, like in the first embodiment, the step 608 is executed through steps 601 to 606. Steps 607 and 609 of the first embodiment are not included in the fifth embodiment. When the debug key is loaded from the IC card connected, the user program is allowed to use the user memory space in the case where the data is read from the secure memory space into the general purpose register and the main part of the data thus read is constituted of the user program.

With this configuration, when the developer debugs the secure program for the user system, the function of the additional bit of the secure information of the general purpose register is stopped by connecting the IC card with the debug key stored therein and loading the debug key. As a result, free data transfer becomes possible between the areas of the user memory space and the secure memory space, thereby making it possible to monitor the secure program. Specifically, the developer can debug the secure program easily by the IC card with the debug key stored therein even in the user environment. In short, the significant effect is exhibited whereby the right equivalent to the privileged mode in the prior art can be acquired.

Sixth Embodiment

Figure 11:
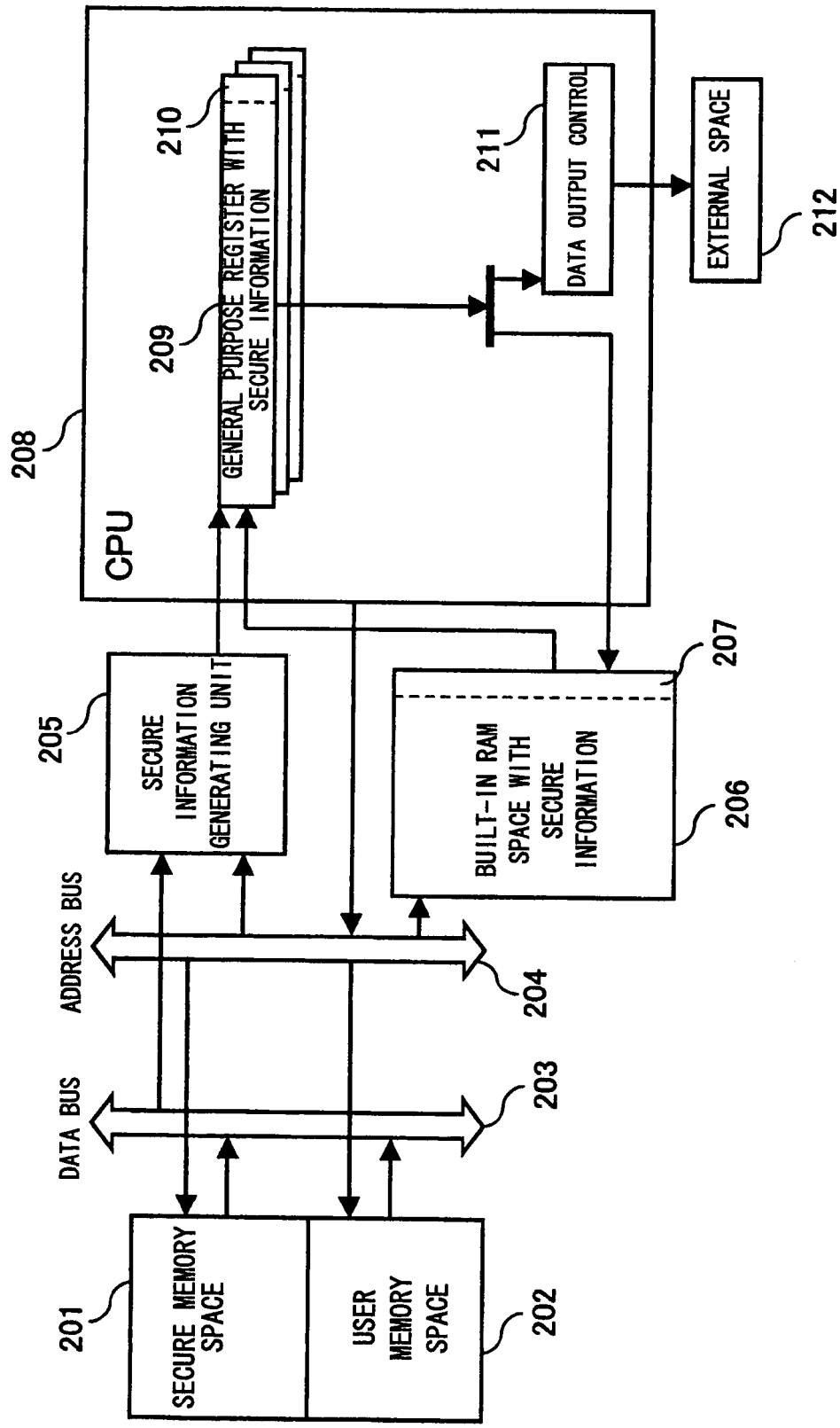
FIG. 11 is a schematic diagram showing a configuration of an information processing apparatus according to a sixth embodiment of the invention.

FIG. 11 is a schematic diagram showing the configuration of the information processing apparatus according to a sixth embodiment of the invention. The information processing apparatus according to this embodiment is configured of a secure memory space 201, a user memory space 202, a data bus 203, an address bus 204, a secure information generating unit 205, a built-in RAM space 206 with secure information, a CPU 208, a general purpose register 209 with secure information, a data output control unit 211 and an external space 212.

Figure 12A:
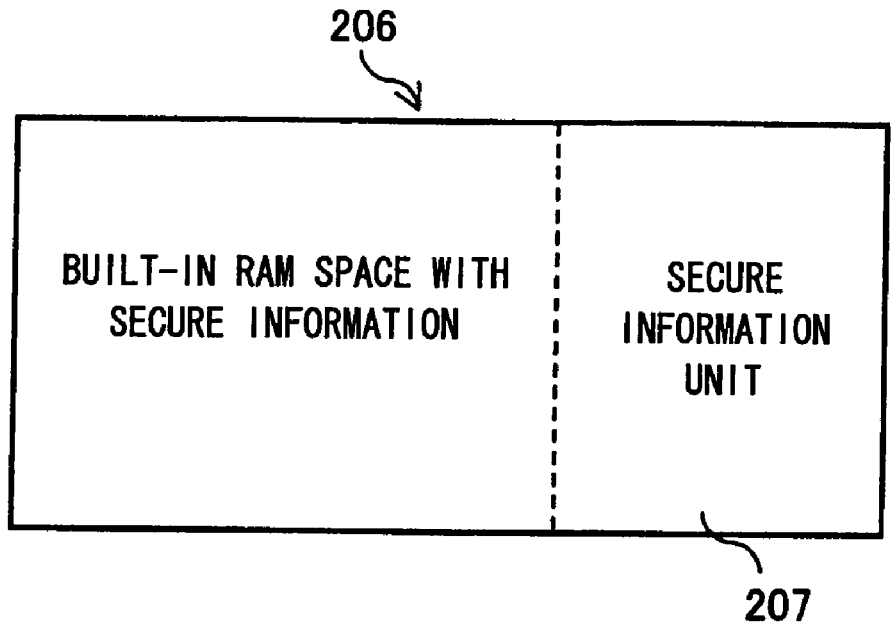
FIG. 12A is a schematic diagram showing a built-in RAM space with secure information according to the sixth to tenth embodiments of the invention.
Figure 12B:
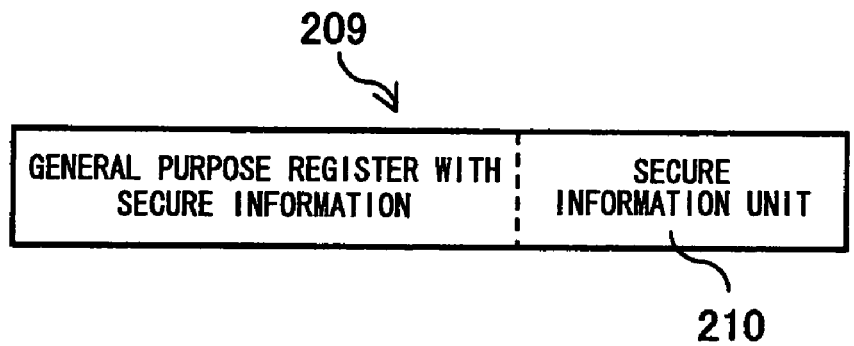
FIG. 12B is a schematic diagram showing a general purpose register with secure information.

Further, as shown in FIGS. 12A and 12B, the built-in RAM space 206 includes an internal secure information unit 207, and the general purpose register 209 includes an internal secure information unit 210.

The CPU 208 designates an address through the address bus 204 when reading the data from the secure memory space 201 or the user memory space 202.

The secure memory space 201 or the user memory space 202 outputs the data in accordance with the address information designated by the address bus 204.

The secure information generating unit 205 receives the data coincident with the designated address information, and determines which of the user memory space 202 and the secure memory space 201 is indicated by the designated address information. In the case where the result of determination shows that the data is associated with the user memory space 202, the data with "0" added thereto as secure information is delivered to the general purpose register 209. In the case where the data is derived from the secure memory space 201, on the other hand, the data with "1" added thereto as secure information is delivered to the general purpose register 209. The secure information is stored in the secure information unit 210 in the general purpose register 209.

Figure 13A:
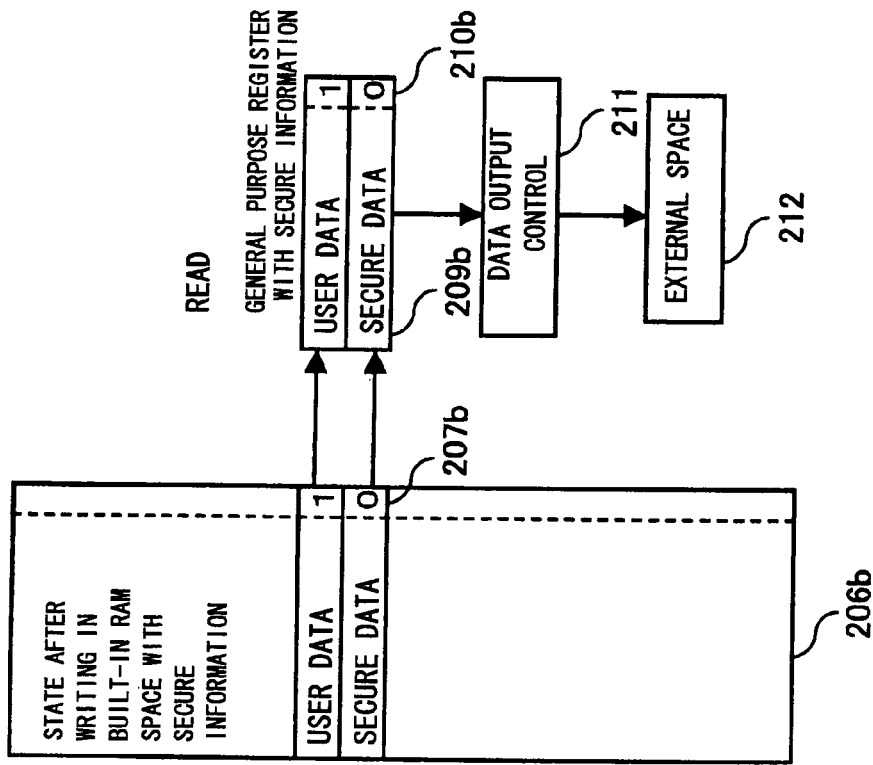
FIGS. 13A and 13B are diagrams showing the state of accessing the built-in RAM space according to the sixth to ninth embodiments of the invention.
Figure 13B:
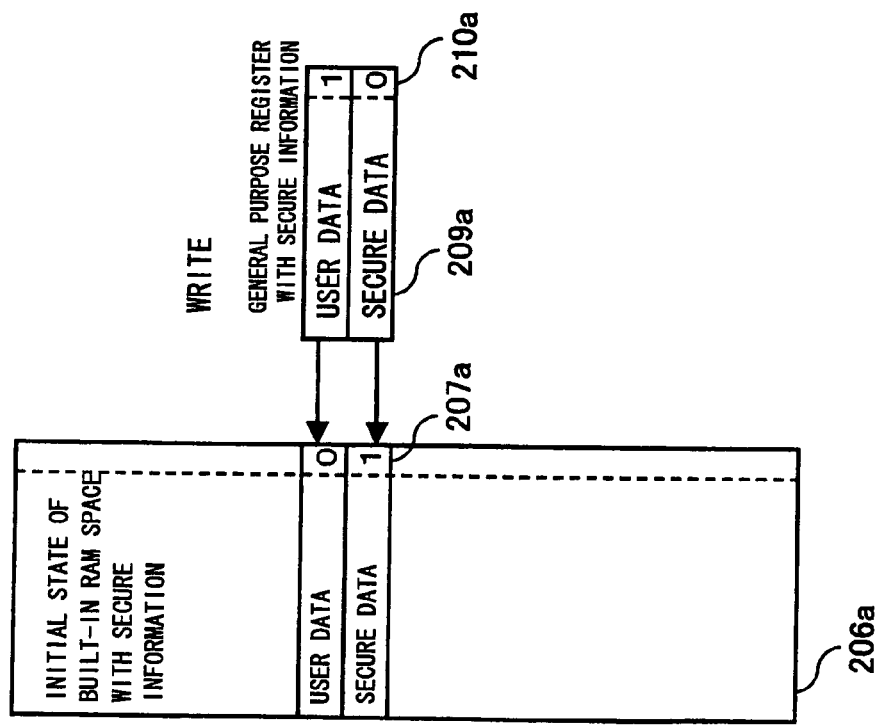

The operation of transferring the data of the general purpose register 209 to the built-in RAM space 206 and the external space 212 is explained with reference to FIGS. 13A and 13B.

Numeral 206a designates the first state of the built-in RAM space 206, numeral 206b the second state of the built-in RAM space 206, numeral 207a the first state of the secure information unit 207, numeral 207b the second state of the secure information unit 207, numeral 209a the first state of the general purpose register 209, numeral 209b the second state of the general purpose register 209, numeral 210a the first state of the secure information unit 210, and numeral 210b the second state of the secure information unit 210.

The CPU 208 writes the data of the first state 209a of the general purpose register 209 in the first state 206a of the built-in RAM space 206. At the same time, the value of the first state 210a of the secure information unit 210 is written in the first state 207a of the secure information unit 207. As a result, these values are converted to the second state 206b of the built-in RAM space 206 and the second state 207b of the secure information unit 207, thereby holding the secure information.

The data of the second state 206b of the built-in RAM space 206, when read by the CPU 208, is delivered to the second state 209b of the general purpose register 209. At the same time, the second state 207b of the secure information 207 is delivered to the second state 210b of the secure information unit 210. As a result, the secure information of the data passed through the built-in RAM space 206 is held.

When the CPU 208 outputs the data of the general purpose register 209 to the external space 212, the data output control unit 211 prohibits the data output to the external space 212 in the case where the value of the secure information unit 210 in the general purpose register 209 is "1".

With this configuration, the data transfer to the external space from the secure memory space through the register according to the user program can be prohibited. In other words, the decoding (hacking) of the secure program is prevented. In this case, the feature of this embodiment lies in that only an additional bit is inserted in the register, and the instruction set of the CPU is not required to be changed. Nor is it necessary to switch between the privileged mode and the normal mode.

Further, the secure information is rendered to follow also the built-in RAM space thereby making possible the security management of the data passing through the built-in RAM space. In this case, since the secure information is added to the data itself, the data of the secure memory space and the data of the user memory space coexist in the built-in RAM space. Thus, a significant effect is exhibited in that the rewriting of the secure data on the built-in RAM space is permitted in compliance with the instruction of the user memory space, and the security management of the built-in RAM space is made possible free of effect on normal operation.

Seventh Embodiment

FIG. 14 is a schematic diagram showing the configuration of the information processing apparatus according to a seventh embodiment of the invention. In FIG. 14, the blocks similar to those of the sixth embodiment shown in FIG. 11 are designated by the same reference numerals, respectively, and not described again.

In FIG. 14, numeral 213 designates an interrupt control unit, numeral 214 an interrupt save information unit with secure information, and numeral 216 an instruction decoder with secure information.

Figure 15A:
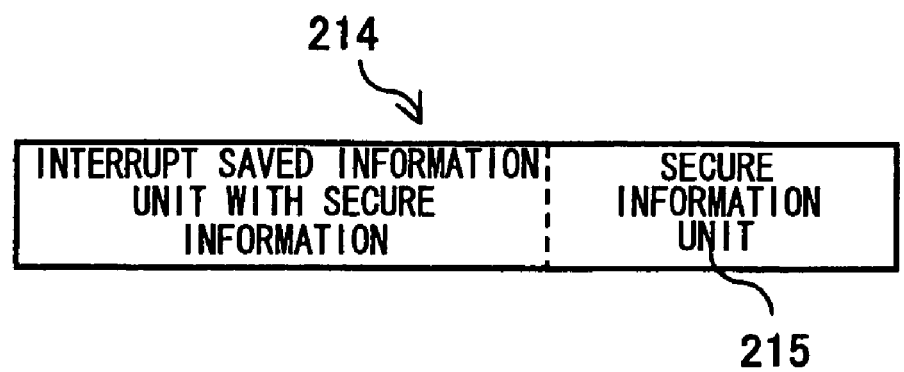
FIG. 15A is a schematic diagram showing an instruction decoder with secure information according to the seventh, eighth and tenth embodiments of the invention.
Figure 15B:
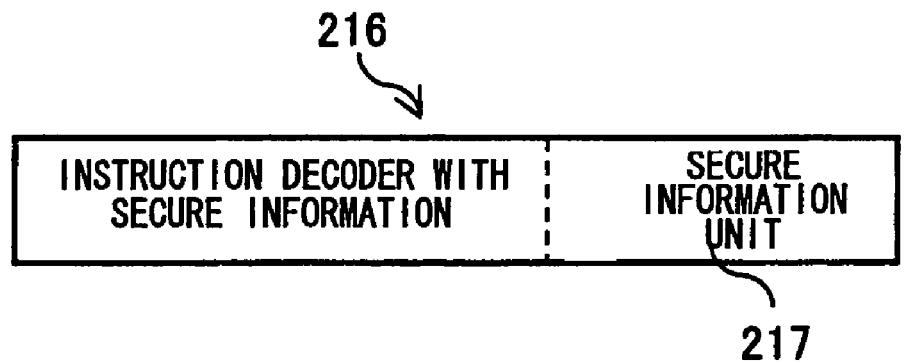
FIG. 15B is a schematic diagram showing an interrupt save information unit with secure information.

As shown in FIGS. 15A and 15B, the interrupt save information unit 214 has an internal secure information unit 215, and the instruction decoder 216 has an internal secure information unit 217.

The CPU 208, when reading data or fetching an instruction from the secure memory space 201 or the user memory space 202, designates an address through the address bus 204.

The secure memory space 201 or the user memory space 202 outputs the data and the instruction in accordance with the address information designated on the address bus 204.

The secure information generating unit 205 receives the data and the instruction coincident with the designated address information, and determines which of the user memory space 202 and the secure memory space 201 is indicated by the designated address information. In the case where the result of determination shows that the data is associated with the user memory space 202, the data with "0" added as secure information is delivered to the general purpose register 209. In the case where data is associated with the secure memory space 201, on the other hand, the data with "1" added thereto as secure information is delivered to the general purpose register 209. The secure information is stored in the secure information unit 210 (see, FIG. 12) in the general purpose register 209.

In the case where the result of determination by the secure information generating unit 205 indicates that the instruction is associated with the user memory space 202, an instruction with "0" added thereto as secure information is delivered to the instruction decoder 216. In the case where the instruction is associated with the secure memory space 201, on the other hand, an instruction with "1" added thereto as secure information is delivered to the instruction decoder 216. The secure information is stored in the secure information unit 217.

The operation of transferring the data of the general purpose register 209 to the built-in RAM space 206 is similar to the corresponding operation explained in the sixth embodiment, and therefore not described again.

Assume that an interrupt process is generated by the interrupt control unit 213. In order to manage the security of the data saved automatically in a part of the built-in RAM space 206, the secure information is attached to the data saved, in accordance with which of the user memory space 202 and the secure memory space 201 is associated with the instruction under execution.

The instruction under execution can be determined from the value of the secure information unit 217 in the instruction decoder 216. The secure information is "0" in the case where the instruction is associated with the user memory space 202, and "1" in the case where the instruction is associated with the secure memory space 201.

In order to clearly indicate whether the information saved automatically at the time of generation of an interrupt is secure information or not, the value of the secure information unit 217 in the instruction decoder 216 is transmitted to the secure information unit 215 in the interrupt save information unit 214.

Further, the data of the interrupt save information unit 214 is saved in a part of the built-in RAM space 206, while at the same time transmitting the value of the secure information 215 in the interrupt save information unit 214 to the secure information unit 207 (see, FIG. 12) in the built-in RAM space 206. As a result, the secure information of the data saved is held.

The operation of transferring the data of the built-in RAM space 206 to the general purpose register 209 is equivalent to the corresponding operation explained in the sixth embodiment, and therefore not described again.

When the CPU 208 outputs the data of the general purpose register 209 to the external space 212, the data output control unit 211 prohibits the data output to the external space 212 in the case where the value of the secure information unit 210 in the general purpose register 209 is "1".

This configuration makes possible the security management in reading the data saved automatically in the stack areas constituting a part of the built-in RAM space by causing the secure information to follow the stack save information due to an interrupt or the like. In this way, a significant effect is achieved, in which the hacking of a crucial task in the secure memory space which may be caused as the execution PC (program counter) executing the instruction of the secure memory space, for example, is read into the external space.

Eighth Embodiment

Figure 16:
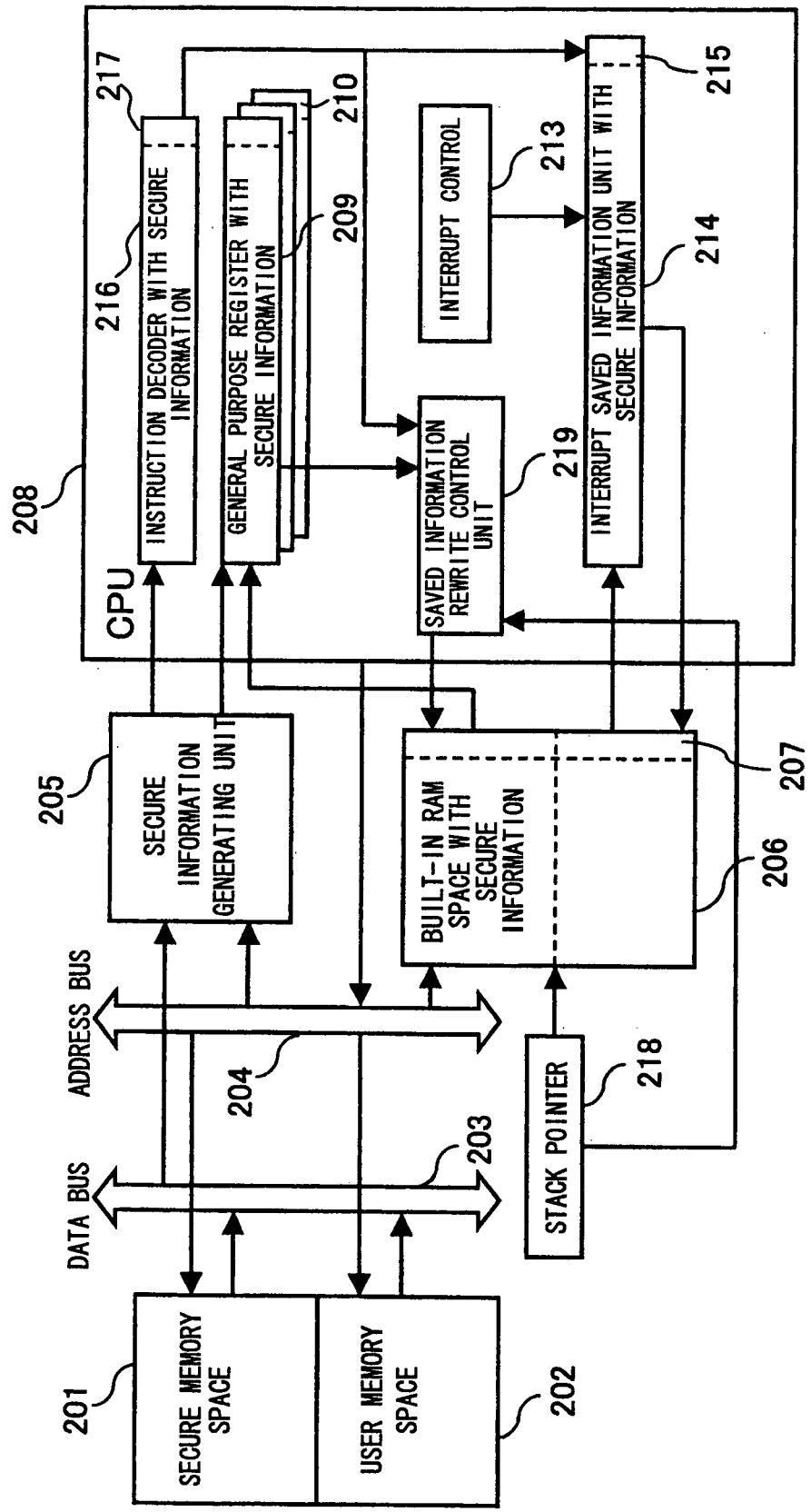
FIG. 16 is a schematic diagram showing a configuration of an information processing apparatus according to an eighth embodiment of the invention.

FIG. 16 is a schematic diagram showing the configuration of the information processing apparatus according to an eighth embodiment of the invention. In FIG. 16, the blocks similar to the corresponding ones of the sixth and seventh embodiments shown in FIGS. 11 and 14 are designated by the same reference numerals, respectively, and not described again.

In FIG. 16, numeral 218 designates a stack pointer and numeral 219 a save information rewrite control unit.

The CPU 208 designates an address through the address bus 204 when reading data or fetching an instruction from the secure memory space 201 or the user memory space 202.

The secure memory space 201 or the user memory space 202 outputs the data and the instruction in accordance with the address information designated by the address bus 204.

The secure information generating unit 205 receives the data and the instruction coincident with the designated address information, and determines which of the user memory space 202 and the secure memory space 201 is indicated by the designated address information. In the case where the result of determination shows that the data is associated with the user memory space 202, the data with "0" added thereto as secure information is delivered to the general purpose register 209. In the case where the data is associated with the secure memory space 201, on the other hand, the data with "1" added thereto as secure information is delivered to the general purpose register 209. The secure information is stored in the secure information unit 210 (see, FIG. 12) in the general purpose register 209. Also, in the case where the instruction is associated with the user memory space 202, the secure information generating unit 205 delivers an instruction with "0" added thereto as secure information to the instruction decoder 216. In the case where the instruction is associated with the secure memory space 201, on the other hand, an instruction with "1" added thereto as secure information is delivered to the instruction decoder 216. The secure information is stored in the secure information unit 217 (see, FIG. 15) in the instruction decoder 216.

In the case where an interrupt or the like process is generated by the interrupt control unit 213, the data automatically saved in the stack area indicated by the stack pointer 218 of the built-in RAM space 206 is subjected to security management. For this purpose, the secure information is attached to the data saved, in accordance with which of the user memory space 202 and the secure memory space 201 is associated with the instruction under execution. The operation of adding the secure information is similar to the corresponding operation in the seventh embodiment and not described again.

Also, the operation of transferring the data in the normal area and the stack area of the built-in RAM space to the general purpose register 209 is similar to the corresponding operation in the sixth embodiment and therefore not described again.

This configuration makes possible security management in reading the data automatically saved in the stack area constituting a part of the built-in RAM space, by adding the secure information to the information saved in the stack area by an interruption or the like.

Further, the operation of transferring (writing) the data of the general purpose register 209 to the normal area of the built-in RAM space 206 is similar to the corresponding operation in the sixth embodiment and therefore not described again.

In the case where the data of the general purpose register 209 is transferred (written) to the stack area of the built-in RAM space 206, the save information rewrite control unit 219 determines which of the user memory space 202 and the secure memory space 201 is associated with the instruction under execution, according to the value of the secure information unit 217 (see, FIG. 15) in the instruction decoder 216. Further, the address of the space of the transfer destination is compared to the stack pointer 218. In the case where the result shows that the instruction is associated with the user memory space 202 and that the transfer is destined for the stack area, then the data transfer is prohibited.

Figure 17B:
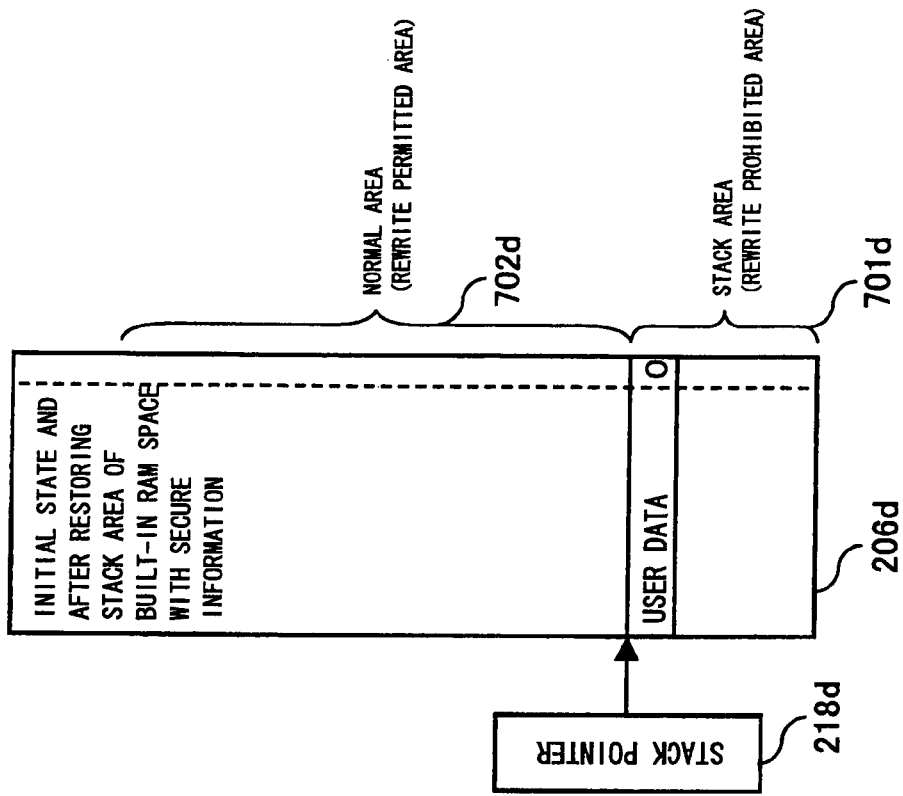
FIGS. 17A and 17B are status diagrams of a stack area in the built-in RAM space with secure information according to the eighth embodiment of the invention.
Figure 17A:
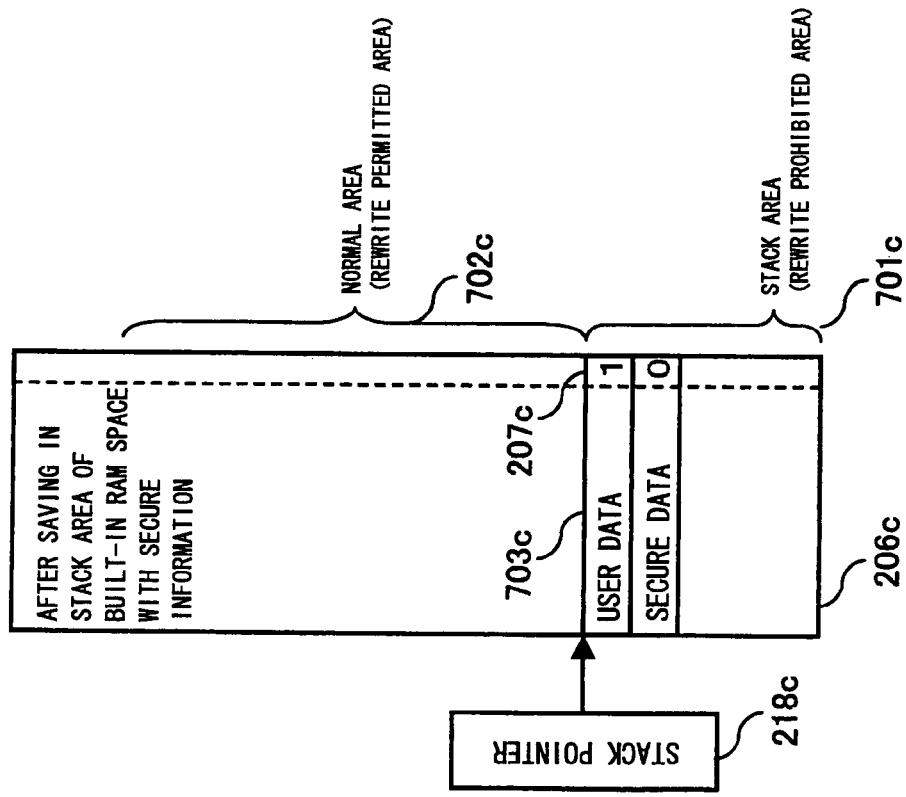

The operation of saving and restoring the data to the stack area constituting a part of the built-in RAM space 206 is explained with reference to FIGS. 17A and 17B.

Numeral 206c designates the first state of the built-in RAM space 206, numeral 206d the second state of the built-in RAM space 206, numeral 207c the first state of the secure information unit 207, numeral 218c the first state of the stack pointer 218, numeral 218d the second state of the stack pointer 218, numeral 701c the first state of the stack area, numeral 701d the second state of the stack area, numeral 702c the first state of the normal area, numeral 702d the second state of the normal area, and numeral 703c the stack save information.

The second state 206d of the built-in RAM space 206 is defined as the initial state. In the case where an interrupt occurs during the execution of an instruction for the secure memory space 201 and the process proceeds to the user memory space 202, the data of the interrupt save information unit 214 is saved in the second state 206d of the built-in RAM space 206, and consequently becomes the stack save information 703c in the first state 206c of the built-in RAM space 206.

Under this condition, the secure information is added to the stack saved information, and therefore the security management is possible in reading the data saved in the stack area. Also, since the first state 701c of the stack area is prohibited from being rewritten in accordance with the instruction of the user memory space 202 by the saved information rewrite control unit 219, the security management is possible in writing the data saved in the stack area.

Once the stack saved information 703c is restored by the restoration from the interrupt, the first state 218c of the stack pointer becomes the second state 218d of the stack pointer. The area of the stack saved information 703c that is no longer required is opened to the first state 702c of the normal area and becomes the second state 702d of the normal area.

With this configuration, the return destination address to the secure memory space saved in the built-in RAM space is prohibited from being rewritten from the instruction of the user memory space by a user interrupt or the like during the execution of an instruction of the secure memory space. As a result, the normal restoration to the secure memory space is guaranteed, while at the same time limiting the access to the secure memory space not permitted for the instruction of the user memory space. In addition, a significant effect is achieved in which the security management of the stack area is made possible by switching the rewrite control operation by the space indicated by the stack pointer without physically dividing the built-in RAM space into the normal area and the stack area.

Ninth Embodiment

FIG. 18 is a schematic diagram showing the configuration of the information processing apparatus according to a ninth embodiment of the invention. In FIG. 18, the blocks similar to the corresponding ones of the sixth embodiment shown in FIG. 11 are designated by the same reference numerals, respectively, and not described again.

Figure 19:
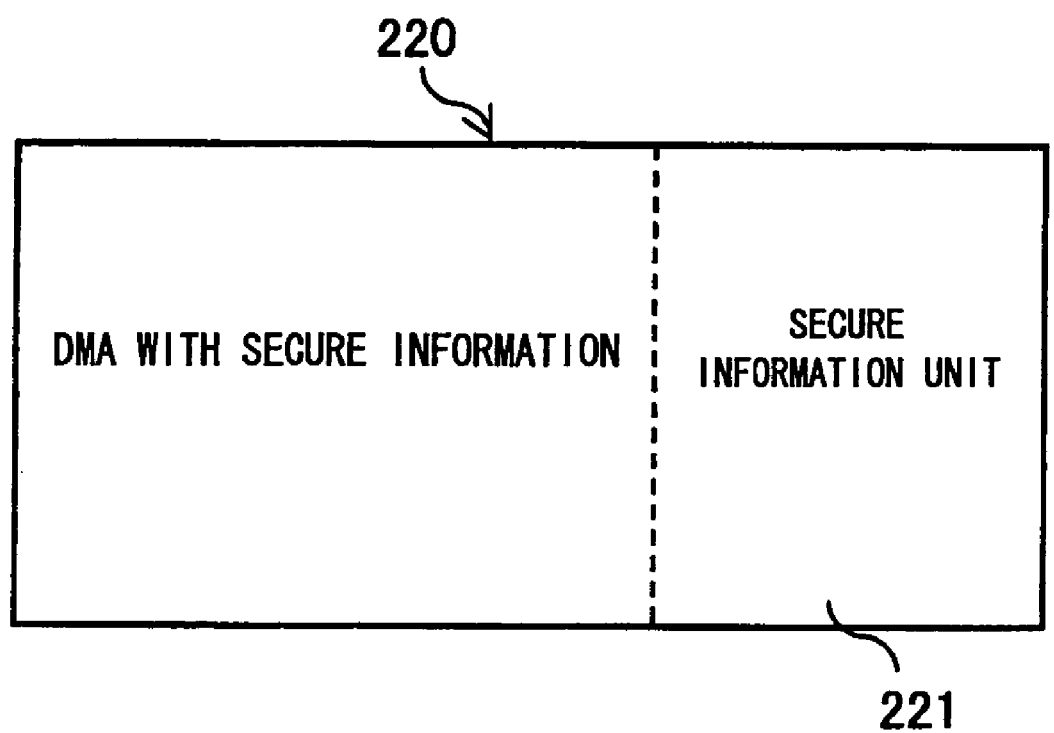
FIG. 19 is a schematic diagram showing a DMA with secure information according to the ninth embodiment of the invention.

In FIG. 18, numeral 220 designates a DMA with secure information. As shown in FIG. 19, the DMA 220 has an internal secure information unit 221.

The DMA 220 designates an address through the address bus 204 at the time of data transfer from the secure memory space 201 or the user memory space 202.

The secure memory space 201 or the user memory space 202 outputs data in accordance with the address information designated by the address bus 204.

The secure information generating unit 205 receives the data coincident with the designated address information, and determines which of the user memory space 202 and the secure memory space 201 is indicated by the designated address information. In the case where the result of determination shows that the data is associated with the user memory space 202, the data with "0" added thereto as secure information is delivered to the DMA 220. In the case where it is determined that the data is associated with the secure memory space 201, on the other hand, the data with "1" added thereto as secure information is delivered to the DMA 220. The secure information is stored in the secure information unit 221 in the DMA 220.

The operation of transferring the data of the DMA 220 to the built-in RAM space 206 and the external space 212 is similar to the corresponding operation of the sixth embodiment and therefore not described again.

The DMA 220 designates an address through the address bus 204 at the time of data transfer from the built-in RAM space 206.

In accordance with the address information designated by the address bus 204, the built-in RAM space 206 outputs the data having added thereto the secure information of the secure information unit 207 (see, FIG. 12).

The DMA 220 receives the data coincident with the designated address information. At the same time, by reflecting the secure information of the secure information unit 207 in the secure information unit 221, the secure information of the data passed through the DMA 220 is held.

With this configuration, the secure information is caused to follow each data transferred to and from the DMA without the intermediary of a CPU, and thereby the security management of the data passing through the DMA is made possible. The data and the instruction of the secure memory space, also when used by being developed in the built-in RAM space by the DMA, can be subjected to the security management. Also, a significant effect is exhibited that in the case where the data and the instruction of the built-in RAM space are transferred to the external space by the DMA, the security management of the data and the instruction of the secure memory space is possible.

Tenth Embodiment

Figure 20:
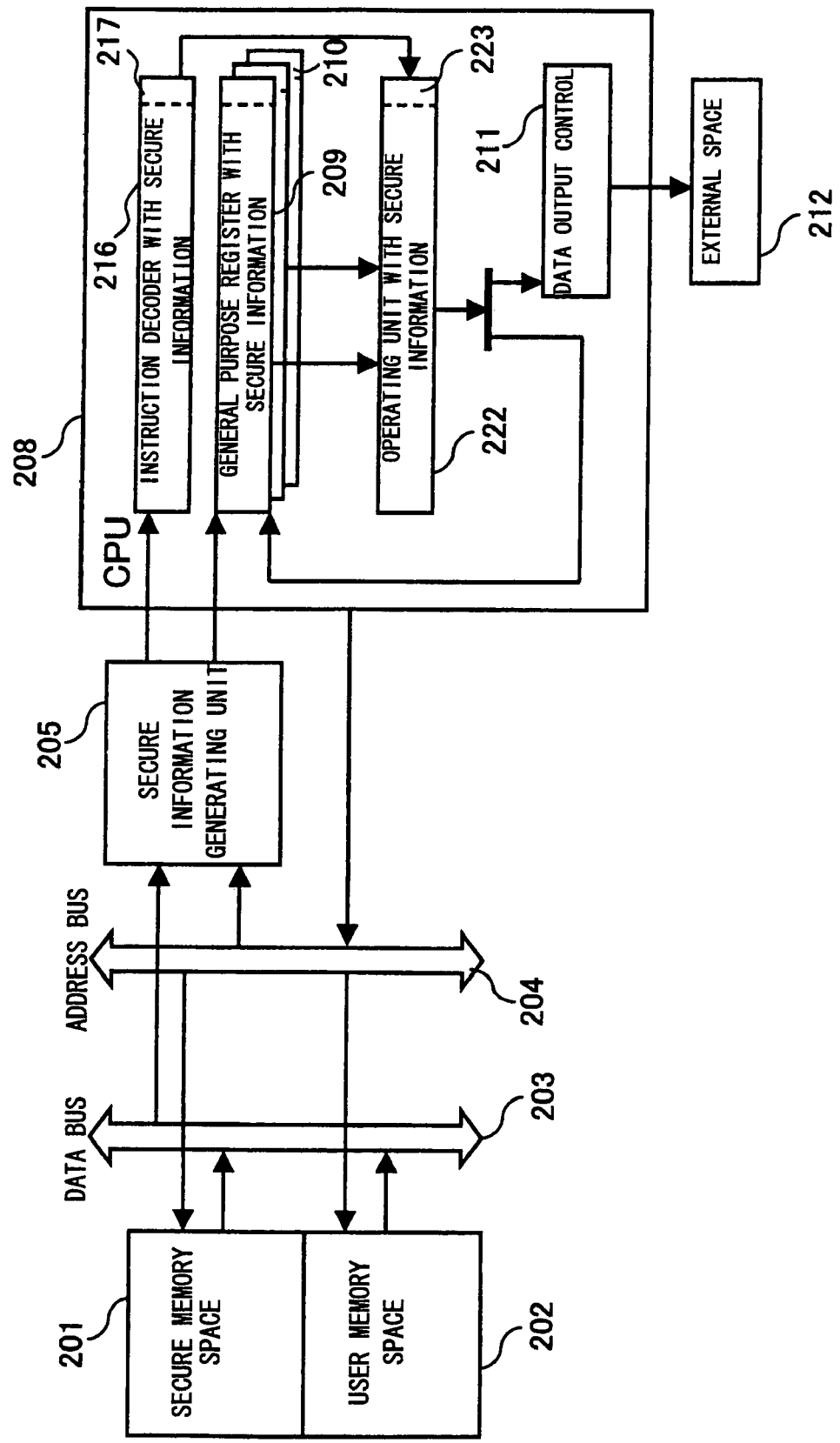
FIG. 20 is a schematic diagram showing a configuration of an information processing apparatus according to a tenth embodiment of the invention.

FIG. 20 is a schematic diagram showing the configuration of the information processing apparatus according to a tenth embodiment of the invention. In FIG. 20, the blocks similar to the corresponding ones of the sixth embodiment shown in FIG. 11 are designated by the same reference numerals, respectively, and not described again.

Figure 21:
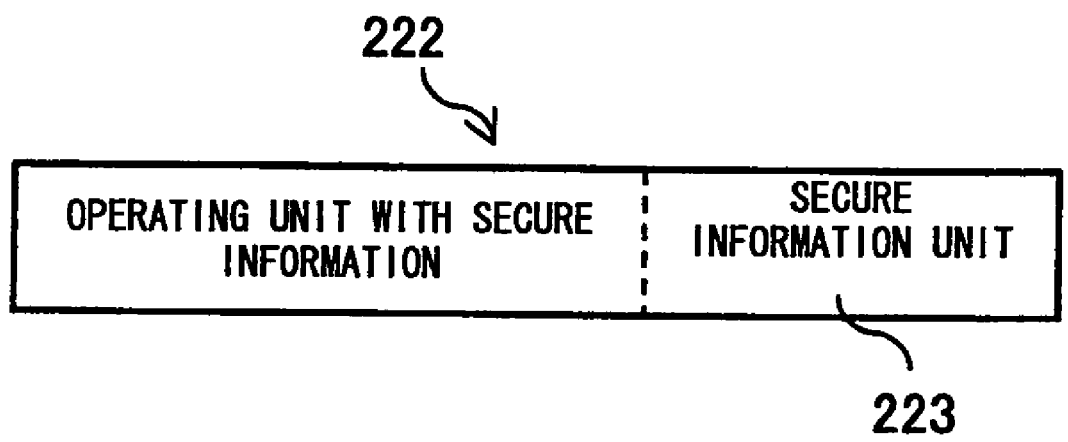
FIG. 21 is a schematic diagram showing an operating unit with secure information according to the tenth embodiment of the invention.

In FIG. 20, numeral 216 designates an instruction decoder with secure information, and numeral 222 an operating unit with secure information. As shown in FIG. 21, the operating unit 222 has an internal secure information unit 223.

The CPU 208 designates an address through the address bus 204 at the time of reading data or fetching an instruction from the secure memory space 201 or the user memory space 202.

The secure memory space 201 or the user memory space 202 outputs the data and the instruction in accordance with the address information designated by the address bus 204 The secure information generating unit 205 receives the data coincident with the designated address information, and determines which of the user memory space 202 and the secure memory space 201 is indicated by the designated address information. In the case where the result of determination shows that the data is associated with the user memory space 202, the data with "0" added thereto as secure information is delivered to the general purpose register 209. In the case where it is determined that the data is associated with the secure memory space 201, on the other hand, the data with "1" added thereto as secure information is delivered to the general purpose register 209. The secure information is stored in the secure information unit 210 (see, FIG. 12) in the general purpose register 209. Also, the secure information generating unit 205 delivers to the instruction decoder 216 an instruction with "0" added thereto as secure information in the case where the instruction is associated with the user memory space 202. In the case where the instruction is associated with the secure memory space 201, on the other hand, the instruction with "1" added thereto as secure information is delivered to the instruction decoder 216. The secure information is stored in the secure information unit 217 (see, FIG. 15) in the instruction decoder 216.

Once the operating instruction of the secure memory space 201 is decoded by the instruction decoder 216, the data of the general purpose decoder 209 is delivered to the operating unit 222, which thus begins the arithmetic operation.

In the process, assume that at least one of the secure information of the secure information unit 210 added to the data of one or more general purpose registers 209 constituting an object of arithmetic operation is "1". The secure information "1" of the secure information unit 210 is transmitted to the secure information unit 223 in the operating unit 222, so that the secure information of the result of the arithmetic operation output from the operating unit 222 is held.

In the case where all the secure information of the secure information unit 210 added to the data of at least one general purpose register 209 constituting an object of arithmetic operation are "0", on the other hand, the secure information "1" of the secure information unit 217 in the instruction decoder 216 is transmitted to the secure information unit 223 in the operating unit 222 thereby to hold the secure information of the operation result output by the operating unit 222.

As the result of decoding the arithmetic operating instruction of the user memory space 202 by the instruction decoder 216, the data of the general purpose register 209 is delivered to the operating unit 222, which thus begins the arithmetic operation.

In the process, assume that at least one of the secure information of the secure information unit 210 added to the data of at least one general purpose register 209 constituting an object of arithmetic operation is "1". The secure information "1" of the secure information unit 210 is propagated to the secure information unit 2223 in the operating unit 222, thereby holding the secure information of the result of arithmetic operation output by the operating unit 222.

In the case where all the secure information of the secure information unit 210 added to the data of at least one general purpose register 209 constituting an object of arithmetic operation are "0", on the other hand, the secure information "0" of the secure information unit 217 in the instruction decoder 216 is propagated to the secure information unit 223 in the operating unit 222, so that the information indicating the lack of security is added to the operation result output from the operating unit 222.

The operation of transferring the data of the operating unit 222 to the external space 212 is similar to the corresponding operation of the sixth embodiment and not described again.

With the aforementioned configuration, assume that an operating instruction associated with the secure memory space is executed and that all the data constituting an object of arithmetic operation are associated with the user memory space or the fact that the data are the secure data is not clearly indicated in the secure information unit. By reflecting the secure information added to the instruction of the secure memory space in the secure information of the operating unit, the operation result is prevented from flowing out to the external space. Thus, a significant effect is achieved in which the contents of the instruction associated with the secure memory space are prevented from being estimated based on the result of arithmetic operation.

Embodiments of the invention are described in detail above. According to this invention, the value of the secure information unit is set to the state not requiring security in the case where the data is transferred to the general purpose register from the user memory space, while the value of the secure information is set to the state requiring security in the case where the data is transferred from the secure memory space to the general purpose register, thereby prohibiting the data transfer from the general purpose register with the value of the secure information unit in the state requiring security to the user memory space. In this way, the secure program and the secure data such as an encryption key on the secure memory space are prevented from being read.

In similar fashion, the data transfer from the secure memory space to the external space can be prohibited without switching between the privileged mode and the normal mode. Further, the secure information is caused to follow the built-in RAM space also thereby making possible the security management of the data passed through the built-in RAM space.

Also, the hacking which otherwise might be caused by reading the interrupt saved data of the secure memory space is prevented. Furthermore, the access to the secure memory space not permitted for the instruction associated with the user memory space is limited. In addition, the secure information is caused to follow the DMA transfer data without intermediary of the CPU, thereby making possible the security management of the data passed through the DMA. What is more, the secure information is also caused to follow the result of arithmetic operation thereby to prevent the leakage to the external space and the estimation of the contents of the instruction associated with the secure memory space.

Specifically, the provision of the secure information unit leads to the advantage that the switching control operation between the privileged mode and the normal mode which has been carried out by the conventional operating system is replaced entirely by the additional bit with only a small hardware change. Especially, the invention is expected to be advantageously utilized for products development relating to the PDA, digital TV and contents service.

From the above description, it will be apparent that the present invention provides.

What is claimed is:

1. An information processing apparatus for accessing memory spaces including a user memory space and a secure memory space, comprising:

a general purpose register used for an arithmetic operation of a CPU and having a function of receiving, delivering and storing data, the general purpose register having a data unit;

a secure information unit included in the general purpose register and adapted to be set to a state not requiring security in a case that the data is transferred from the user memory space to the data unit of the general purpose register, and adapted to be set to a state requiring security in a case that the data is transferred from the secure memory space to the data unit of the general purpose register;

a data control unit having a function of determining whether a value of the secure information unit is in the state requiring security or the state not requiring security when the data of the general purpose register is written in the user memory space, thereby determining whether a data transfer to the user memory space is prohibited or not;

an address control unit having a function of determining which of the user memory space and the secure memory space is indicated by an address information, and selecting the value of the secure information unit;

a user program arranged in the user memory space;

a secure program arranged in the secure memory space;

an instruction fetch address control unit having a function of determining which of the user memory space and the secure memory space is indicated by the address information when storing an instruction code input from the data control unit, and a function of notifying the data control unit which of the user program and the secure program is under execution;

an instruction buffer used by the CPU to fetch the instruction code and having a function of storing therein the instruction code input from the data control unit;

a plurality of the general purpose registers and a plurality of the secure information units included in each of the general purpose registers, respectively, the secure information units further being capable of being set to a state of invalid security, and a general purpose register file, the general purpose register file is configured to set, when performing the arithmetic operations between at least two of the general purpose registers in compliance with an operating instruction, the value of the secure information unit of the general purpose registers to which a result of the arithmetic operation is stored to the state of invalid security, if at least one of the values of the secure information unit indicates that the general purpose register having the state requiring security is operated, wherein:

when the data control unit issues the operating instruction to the general purpose register with the secure information unit having the state of invalid security, the data control unit prohibits the arithmetic operation, if the instruction fetch address control unit determines that the operating instruction has been fetched from the user memory space, and when the data control unit executes the data transfer from the data unit of the general purpose register to the memory spaces in compliance with a transfer instruction, the data transfer to the user memory space is prohibited, if the instruction fetch address control unit determines that the instruction code is fetched from the user memory space and the value of the secure information unit indicates the state requiring security.

2. The information processing apparatus according to claim 1, wherein the user program is accessible mainly by a user, and the secure program is accessible mainly by a developer and contents of the secure program is not disclosed to the user.

3. The information processing apparatus according to claim 1, wherein the data control unit determines whether the data transfer to the user memory space is prohibited or not irrespective of a mode associated with a CPU.

4. The information processing apparatus according to claim 3, wherein the mode associated with the CPU includes a privileged mode or an unprivileged mode.

5. An information processing apparatus for accessing memory spaces including a user memory space and a secure memory space, comprising:

a general purpose register used for an arithmetic operation of a CPU and having a function of receiving, delivering and storing data, the general purpose register having a data unit;

a secure information unit included in the general purpose register and adapted to be set to a state not requiring security in a case that the data is transferred from the user memory space to the data unit of the general purpose register, and adapted to be set to a state requiring security in a case that the data is transferred from the secure memory space to the data unit of the general purpose register;

a data control unit having a function of determining whether a value of the secure information unit is in the state requiring security or the state not requiring security when the data of the general purpose register is written in the user memory space, thereby determining whether a data transfer to the user memory space is prohibited or not;

an address control unit having a function of determining which of the user memory space and the secure memory space is indicated by an address information, and selecting the value of the secure information unit;

a user program arranged in the user memory space;

a secure program arranged in the secure memory space;

an instruction fetch address control unit having a function of determining which of the user memory space and the secure memory space is indicated by the address information when storing an instruction code input from the data control unit, and a function of notifying the data control unit which of the user program and the secure program is under execution; and an instruction buffer used by the CPU to fetch the instruction code and having a function of storing therein the instruction code input from the data control unit; and a status register used for the arithmetic operation of the CPU and having a function of holding a value of a result of a comparative arithmetic operation as a comparative flag, the status register further having a function of keeping a value of each comparative flag unchanged, when the arithmetic operation is executed between at least two of the general purpose registers in compliance with an operating instruction, if at least one of the general purpose registers indicates the state requiring security and the instruction fetch address control unit determines that the operating instruction has been fetched from the user memory space, wherein:

when the data control unit executes the data transfer from the data unit of the general purpose register to the memory spaces in compliance with a transfer instruction, the data transfer to the user memory space is prohibited, if the instruction fetch address control unit determines that the instruction code is fetched from the user memory space and the value of the secure information unit indicates the state requiring security.

6. An information processing apparatus for accessing memory spaces including a user memory space and a secure memory space, comprising:

a general purpose register used for an arithmetic operation of a CPU and having a function of receiving, delivering and storing data, the general purpose register having a data unit;

a secure information unit included in the general purpose register and adapted to be set to a state not requiring security in a case that the data is transferred from the user memory space to the data unit of the general purpose register, and adapted to be set to a state requiring security in a case that the data is transferred from the secure memory space to the data unit of the general purpose register;

a data control unit having a function of determining whether a value of the secure information unit is in the state requiring security or the state not requiring security when the data of the general purpose register is written in the user memory space, thereby determining whether a data transfer to the user memory space is prohibited or not;

an address control unit having a function of determining which of the user memory space and the secure memory space is indicated by an address information, and selecting the value of the secure information unit;

a user program arranged in the user memory space;

a secure program arranged in the secure memory space;

an instruction fetch address control unit having a function of determining which of the user memory space and the secure memory space is indicated by the address information when storing an instruction code input from the data control unit, and a function of notifying the data control unit which of the user program and the secure program is under execution;

an instruction buffer used by the CPU to fetch the instruction code and having a function of storing therein the instruction code input from the data control unit;

a read/write user IO space used for accessing the user memory space from outside; and a read/write secure IO space used for accessing the secure memory space from outside, wherein:

the information processing apparatus is configured to receive an IC card connectable to the secure IO space and having a function of storing data, the IC card further including a debug key configured to stop, when read out by the CPU through the secure IO space when a developer debugs the secure program with a user system, an address determining function performed by the instruction fetch address control unit and the address control unit, when the data control unit executes the data transfer from the data unit of the general purpose register to the memory spaces in compliance with a transfer instruction, the data transfer to the user memory space is prohibited, if the instruction fetch address control unit determines that the instruction code is fetched from the user memory space and the value of the secure information unit indicates the state requiring security, and when transferring the data from the data unit of the general purpose register to the memory spaces in compliance with the transfer instruction, the data control unit permits the data transfer to the user memory space regardless the instruction code is fetched either from the user memory space or the secure memory space, if the debug key is read by the CPU.

* * * * *